United States Patent [19]

Inoue et al.

[11] Patent Number: 5,446,552
[45] Date of Patent: * Aug. 29, 1995

[54] VIDEO SIGNAL RECORDING/REPRODUCING APPARATUS

[75] Inventors: Sadayuki Inoue; Toshifumi Fujii, both of Kyoto, Japan

[73] Assignee: Mitsubishi Denki Kabushiki Kaisha, Tokyo, Japan

[ * ] Notice: The portion of the term of this patent subsequent to May 25, 2010 has been disclaimed.

[21] Appl. No.: 273,921

[22] Filed: Jul. 12, 1994

Related U.S. Application Data

[63] Continuation of Ser. No. 24,488, Mar. 1, 1993, Pat. No. 5,339,165, which is a continuation of Ser. No. 816,844, Dec. 31, 1991, Pat. No. 5,214,515, which is a continuation of Ser. No. 545,127, Jun. 26, 1990, abandoned, which is a continuation of Ser. No. 114,651, Oct. 28, 1987, abandoned.

[30] Foreign Application Priority Data

Oct. 28, 1986 [JP] Japan .................. 61-257408
Jun. 26, 1987 [JP] Japan .................. 62-160347
Jul. 15, 1987 [JP] Japan .................. 62-109149

[51] Int. Cl.⁶ ............................................. H04N 5/76
[52] U.S. Cl. ................................. 358/335; 360/10.1
[58] Field of Search ............... 358/336, 335, 337, 338, 358/312; 360/10.1, 10.3, 33.1, 64, 73.01, 73.05, 73.08

[56] References Cited

U.S. PATENT DOCUMENTS

| | | |
|---|---|---|
| 4,064,538 | 12/1977 | Broussand . |
| 4,139,867 | 2/1979 | Foerster . |
| 4,197,562 | 4/1980 | Kikuya et al. . |
| 4,198,662 | 4/1980 | Schopper . |
| 4,287,539 | 9/1981 | Bixby et al. . |
| 4,328,518 | 5/1982 | Kawata et al. . |
| 4,338,631 | 7/1982 | Ota . |
| 4,342,053 | 7/1982 | Hirota . |
| 4,388,657 | 6/1983 | Hedlund et al. . |
| 4,392,162 | 7/1983 | Yamamoto . |
| 4,426,666 | 1/1984 | Kobayashi et al. . |
| 4,463,390 | 7/1984 | Koga et al. . |
| 4,484,236 | 11/1984 | Wilkinson . |
| 4,489,352 | 12/1984 | Kobayashi et al. ............. 360/10.3 |
| 4,491,878 | 1/1985 | Toba . |
| 4,535,367 | 8/1985 | Kanda . |
| 4,558,376 | 12/1985 | Heitmann . |
| 4,597,020 | 6/1986 | Wilkinson . |
| 4,600,952 | 7/1986 | Igata et al. . |
| 4,611,252 | 9/1986 | Igata et al. . |
| 5,214,515 | 5/1993 | Inowe et al. . |

(List continued on next page.)

FOREIGN PATENT DOCUMENTS

| | | |
|---|---|---|
| 0049989 | 4/1982 | European Pat. Off. . |
| 2814082 | 10/1978 | Germany . |
| 2725365 | 12/1978 | Germany . |

(List continued on next page.)

OTHER PUBLICATIONS

J. Heitmann, Rundfunktechnische Mitteilugen, 22nd year (1978) 1st Issue, pp. 15–21.
Nakajima et al., "Field Memory Built-In Home VCR (List continued on next page.)

*Primary Examiner*—Howard W. Britton
*Assistant Examiner*—Robert Chevalier
*Attorney, Agent, or Firm*—Wolf, Greenfield & Sacks

[57] ABSTRACT

A reproducing apparatus adapted to a video signal recording/reproducing apparatus for reproducing a video signal recorded on a record medium in the form of an L-channel/S-segment recording system. The record medium travelling speed in production, the output from comparators and the guard band width are adjusted so that writing of the video signal in a field memory is effected so as not to cause omission of any portion of the video signal. Four embodiments are disclosed.

10 Claims, 23 Drawing Sheets

U.S. PATENT DOCUMENTS 4,644,415  2/1987  Serizawa et al. .
4,739,419  4/1988  Schauffele .
4,785,358  11/1988  Ninomiya .
4,791,507  12/1988  Doyama et al. .
4,796,104  1/1989  Ito et al. .
4,796,123  1/1989  Takenchi et al. .
4,912,571  3/1990  Sekiya et al. .

FOREIGN PATENT DOCUMENTS 3226729  2/1983  Germany .
60-261267  12/1985  Japan .
2160066  12/1985  United Kingdom .

OTHER PUBLICATIONS

Improving Noise Bar and Skew Distortions," Nikkei Electronics, Oct. 20, 1966 (No. 406) pp. 195–202.

Seiichi Mita et al., "Digital Video Recording Techniques Using ½ Inch Metal Particle Tape," Iee Transactions on Consumer Electronics, Aug. 1985, (vol. CE–31, No. 3), pp. 386–397.

Igota et al., "Wideband Recording Technology for High–Definition Baseband VCRs," IEE Transactions on Consumer Electronics, Aug. 1987, (vol. CE–33, No. 3), pp. 203–209.

n p

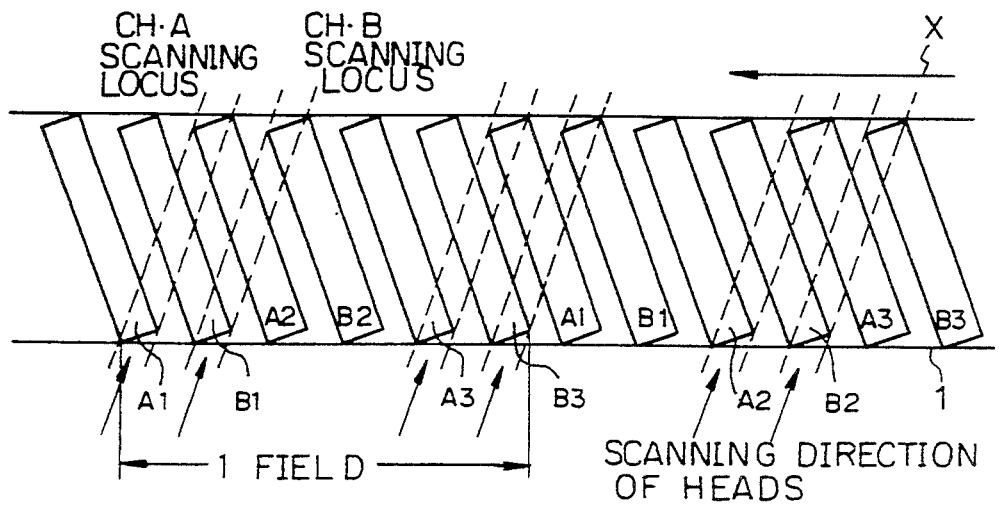
*Fig. 6(d)*
PRIOR ART
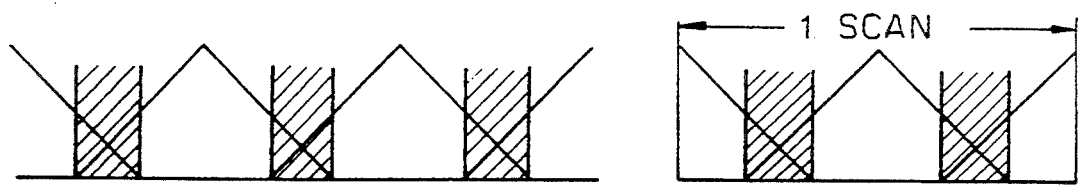
*Fig. 6(e)*
PRIOR ART
*Fig. 6(f)*
PRIOR ART
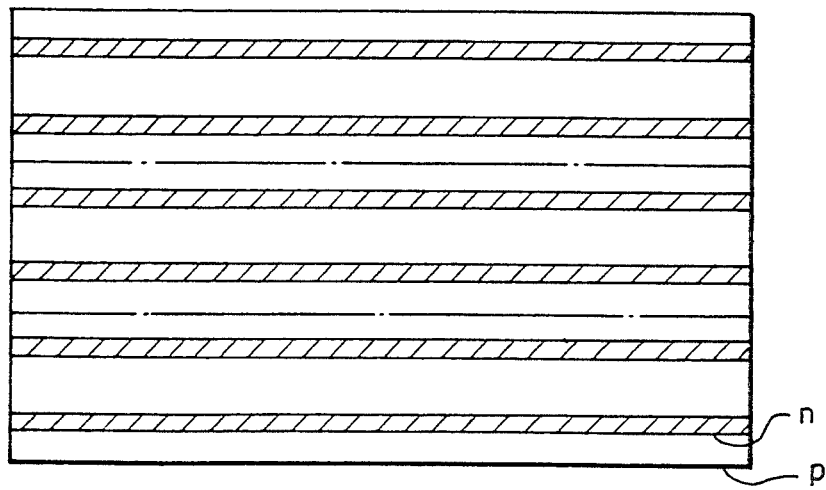
*Fig. 6(g)*
PRIOR ART

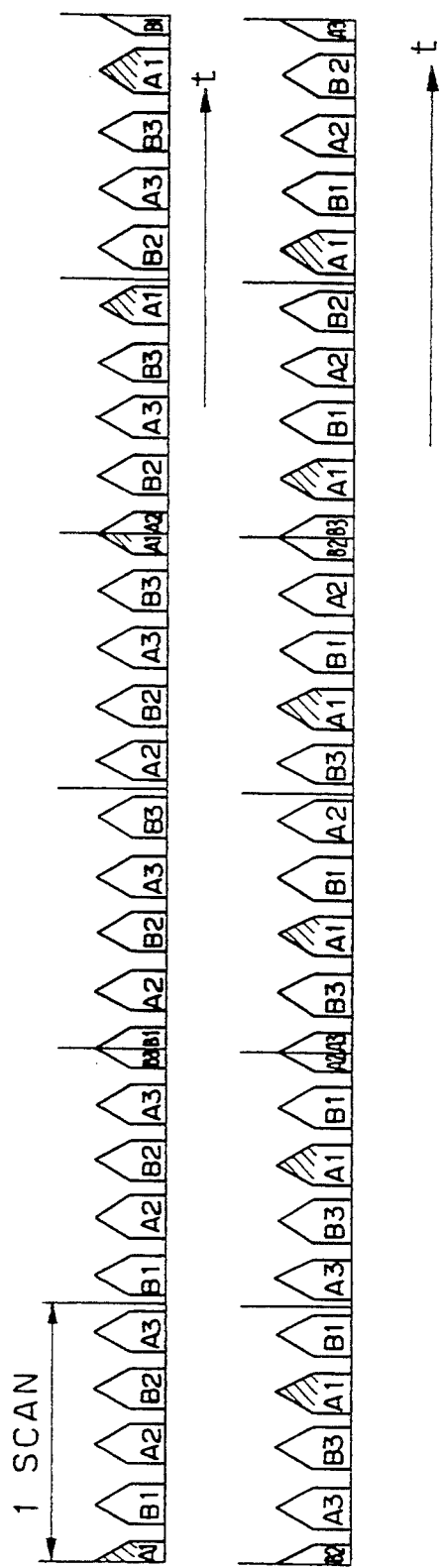
Fig. 8(d)
Fig. 8(e)
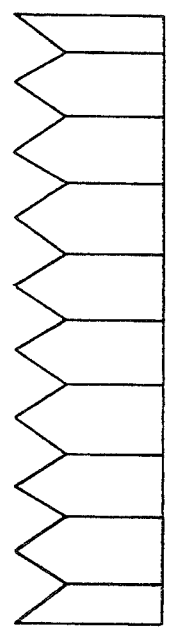

ORDINARY HEADS    SPECIAL HEADS

VIDEO SIGNAL RECORDING/REPRODUCING APPARATUS

This application is a continuation of application Ser. No. 08/024,488 filed Mar. 1, 1993, now U.S. Pat. No. 5,339,165; which is a continuation of Ser. No. 07/816,844, filed Dec. 31, 1991, now U.S. Pat. No. 5,214,515; which is a continuation of Ser. No. 07/545,127, filed Jun. 26, 1990, abandoned; which is a continuation of Ser. No. 07/114,651, filed Oct. 28, 1987, abandoned.

BACKGROUND OF THE INVENTION

1. Field of the Invention

The present invention relates to video signal recording/reproducing apparatus wherein visually satisfactory images can be obtained without generating noise bands and reducing the signal-to-noise ratio in case of a high or changed speed reproduction mode, such as the search mode.

2. Description of the Prior Art

Enhancement in quality of a picture based on changed or high speed reproduction of the VTR taking a recording system (one-channel/one-segment recording system) for recording video signals for one field on one track of a magnetic tape has heretofore been attained by highly accurate control of the travelling of the magnetic tape or by use of special reproduction heads. With recent tendencies to a decrease in price of semiconductor products such as memories and to higher speed/higher density thereof, some VTRs have been offered incorporating a field memory to execute changed speed reproduction. The changed speed reproduction making use of the field memory will be explained as follows.

FIG. 1 is a schematic diagram illustrating a conventional changed speed reproduction system of a VTR which employs the field memory. Information which has been recorded on a magnetic tape 1 is reproduced by means of rotary heads 1a and 1b having different azimuth angles to each other. Outputs of the rotary heads 1a and 1b are transmitted to and amplified by head amplifiers 2a and 2b. Any one of the outputs of the head amplifiers 2a and 2b is selected by a switching circuit 3. The output selected by the switching circuit 3 is given to a video signal processing circuit 4 which FM-demodulates the output from switching circuit 3. Then a video signal is reproduced and at the same time a synchronization signal is detected.

The output selected by the switching circuit 3 is also transmitted to an envelope detecting circuit 5, thereby obtaining an envelope of the reproduced FM signal. The outputs of the envelope detecting circuit 5 are supplied to a comparator 6 to be compared with a predetermined level. A resulting signal from the comparator 6 is sent to a memory control circuit 7. Then, the memory control circuit 7 supplies a write-enable signal to a field memory 8 to carry out write-control on the basis of the synchronization signal emitted from the video signal processing circuit 4 and of the control signal from the comparator 6, and further performs readout-control in asynchronism with the synchronization signal.

A control head 9 is provided and serves to read a second control signal recorded on the magnetic tape 1 in order to transmit it to a travelling control circuit 10. The travelling control circuit 10 sends a drive signal to a motor driver 11 on the basis of the second control signal read by the control head 9. Motor driver 11 drives a capstan motor 12. The rotation frequency of this capstan motor 12 is detected and sent to the travelling control circuit 10.

Next, the operation of the reproduction system of the prior art VTR will be described with reference to FIGS. 1 to 3 and in case of the high speed reproduction which is effected at an N-fold speed [N=±2, ±4, ±6, . . . ; (±) indicates the travelling direction, (+) indicates that reproduction is made in the same direction as that in the ordinary reproduction, and (−) shows that the direction of reproduction is opposite to the ordinary direction]. FIG. 2(a) shows the relation between the recording tracks and the scanning loci of the heads when N equals six and the magnetic tape runs in the direction indicated by the arrow X.

In FIGS. 2(a) and 2(b), "R" and "L" written on the tracks indicate that the portions marked with "R" and "L" have been recorded by the rotary heads 1a and 1b or by other heads having the same azimuth angle as rotary heads 1a and 1b. The signals recorded on the portions depicted with oblique lines are reproduced by the respective heads owing to the azimuth effect. The comparator 6 compares the outputs from the envelope detecting circuit 5 with the predetermined level and the outputs a signal to the memory control circuit 7 when the former exceeds the latter. Thus the memory control circuit 7 operates to write the outputs of the video signal processing circuit 4 to the field memory 8 when the output of the envelope detecting circuit 5 exceeds the predetermined level. It follows therefore that in the field memory 8 the video signals corresponding to one field are recorded in a pattern such as illustrated in FIG. 2(b).

On the other hand, the high definition television system which has been developed as a television system for the next generation is now being put into practical use. Such a high definition television system has a wide video signal band of approximately 20 MHz. As a means for recording such a wide band signal, the multichannel/multisegment recording system has been employed. Namely, the formation into multichannels contributes to reduction in the signal band width of one channel, while the formation into multisegments contributes to a rise in the speed of the magnetic tape relative to that of the rotary head, with the result that the recorded wavelength is increased. With this arrangement, the wide band signals are recorded and reproduced by the conventional magnetic recording technology.

An example wherein the two-channel/three-segment recording system is employed will be explained hereinafter.

FIGS. 3(a) to 3(d) show the concept of the two-channel/three-segment recording system. In FIG. 3(a) illustrating the disposition of the rotary heads, the numeral 13 denotes a rotary drum; 14a and 14b represent rotary heads for recording/reproducing the signals of channel A (hereinafter referred to as CH. A); 15a and 15b designate the rotary heads for recording/reproducing the signals of channel B (hereinafter referred to as CH. B), the rotary heads 14a, 15a and 14b, 15b being adjacently disposed. During recording, the rotary heads simultaneously perform the recording operation on both the channels A and B, as illustrated in FIG. 3(d). The magnetic tape is wound over the range of 180° or more on the rotary drum 13 in recording and reproducing. The rotary drum 13 makes one and a half revolutions in the direction indicated by an arrowhead A in FIG. 3a during the one-field period, whereby the video signals of CHs. A and B for one field are recorded in the form of the split three segments.

As shown in FIG. 3(c), an input video signal such as the composite signal of one channel is allocated sequentially from above to the individual segments of the respective channels by employing the field memory on the basis of the unit of one horizontal scanning period. Therefore, a picture is, as illustrated in FIG. 3(b), divided into the total of six pictures, and each of the pictures thus obtained is recorded on one track of the magnetic tape.

The reference symbols A1, A2, . . . recorded on the tracks shown in FIG. 3(d) designate pieces of image information of the first, the second, . . . segments . . . of CH. A.

It is to be noted that it is possible to attain in a relatively easy manner high speed reproduction in a VTR which adopts the multichannel/multisegment recording system where the recording is effected according to the above described tape format. To be specific, the lower part of the track corresponds to the upper part of the picture, the central part corresponds to the central part of the picture, and the upper part of the track corresponds to the lower part of the picture. For this reason, even if the order in which the six pictures shown in FIG. 3(b) are superimposed on each other is slightly changed, no visual problem arises because in the high speed reproduction the motion of images appears to be unnatural. Namely, where the fetch into the field memory is performed, when reproducing, for instance, the information A1, the reproduced outputs may not be input to the exact address into which the information A1 should be written. Instead, the image information obtained by reproducing, for example, the information A3, is input with respect to the address with which the information A1 should be input. This does not cause serious visual problems.

In the changed speed reproduction from the VTR which takes the multichannel/multisegment recording system having the above-described recording format, if the full video information on the track is completely reproduced in a cycle within a given period, it is possible to actualize satisfactory reproduction with no noise in the changed speed reproduction, even if there is some unnaturalness.

FIG. 4 is a block diagram of a prior art video signal recording/reproducing apparatus which adopts the two-channel/three-segment recording system. In the figure, the same reference numerals as used in FIG. 1 denote like elements. Reference numerals 16a and 16b designate rotary heads for the CHs. A and B; reference numerals 17a and 17b designate rotary heads for the CHs; and 4a and 4b stand for video signal processing circuits which produce a video signal by effecting FM-demodulation and detect a synchronous signal for A/D conversion. The reference numerals 7a and 7b stand for memory control circuits for executing write-control in response to the synchronization signal emitted from the video signal processing circuit 4a and 4b and for executing read-control in asynchronism with the synchronization signal.

Field memory 8 comprises two memories 8a and 8b for CHs. A and B, respectively. The reference numeral 18 stands for a selector.

Next, the operation of the apparatus of FIG. 4 will be explained. Where the high speed reproduction is carried out at a speed N times the recording speed (N=±2, ±3, . . . : (±) indicates the travelling direction, (+) shows the same direction as that of the ordinary reproduction, and (−) shows the opposite direction), and when N=4, the relation between recording tracks and the head scanning loci is established as illustrated in FIG. 5(a). If the rotary heads for CHs. A and B have different azimuth angles, the signals which are to be reproduced by the respective heads by virtue of azimuth effect comprise those obtained from the portions depicted with the oblique lines on the tracks. Turning our attention to FIG. 5(b), reproduction envelopes to be emitted are shown. In the figure, no reproduction output is obtained in the portions indicated by the oblique lines. As explained earlier, the video signal is recorded in such a tape format that the lower part of the track corresponds to the upper part of the picture, the central part corresponds to the central part of the picture, and the upper part corresponds to the lower part. Hence, the video information in the field memory cannot be rewritten with respect to the portions depicted with the oblique lines in FIG. 5(b). As a result, the fixed noise bands n, or the noise bars shown in FIG. 5(c) are produced on the picture p.

Once such fixed noise bands n appear, the problem of being unable to obtain visually favourable images arises.

An example of a two-channel/three-segment recording system is given below. The input image signals (composite signals of one channel) are allocated to two channels (CH. A and CH. B) on the basis of a unit of one horizontal scanning period (hereinafter referred to as 1 H) and the length of the time axis is doubled. As a result, the signal band width of each channel is reduced to half the original width.

FIG. 6(a) shows the placement of the rotary heads. In FIG. 6(a), a rotary drum 13 is provided with rotary heads 14a, and 14b for recording/reproducing the signals of CH. A and rotary heads 15a and 15b for recording/reproducing the signals of CH. B. The two pairs of rotary heads 14a, 15a and 14b, 15b are contiguously disposed. The magnetic tape is wound at an angle of 180° on the rotary drum 13 at the recording/reproducing time. The rotary drum 13 makes one and a half revolutions during one field period. Hence, it follows that the image signals for one field are recorded so that the signals of CHs. A and B are respectively split into three sections (three segments).

FIG. 6(b) shows a concept of the two-channel/three-segment recording system. FIG. 6(c) illustrates a recording track pattern formed on the magnetic tape. A1, A2, and A3 shown on the tracks in FIGS. 6(b) and 6(c) indicate the image signals of the first, second and third segments which are recorded by means of the rotary heads 14a and 14b corresponding to channel A.

The high speed reproduction in which the tape traveling velocity is, as in the prior art, set to be an integer multiple is now considered. When N=2, the relation between the recording tracks and the scanning loci of the heads is as shown FIG. 6(d). Where the rotary heads 14a, 14b, 15a, and 15b have the same azimuth, no azimuth effect is present. Hence, it is possible to reproduce the image signals of all the tracks that the heads have traversed. While, on the other hand, as can be seen in the portions depicted with the oblique lines in FIG. 6(e), there are sections in which the signals recorded by the rotary heads 14a and 14b and the signals recorded by the rotary heads 15a and 15b are simultaneously read. The image signals are superposed on each other in these sections, whereby favorable outputs cannot be obtained.

Considering such circumstances, the output envelopes of the first segment CH. A are shown in FIG. 6(f). In the figure, the superposition takes place in the portions indicated by the oblique lines, and hence no good picture is obtained.

FIG. 6(g) illustrates an actual picture. The portions shown by the oblique lines present a situation where the image information of the field memory is not rewritten, and fixed noise bands are created such that a visually good picture is not acquired.

SUMMARY OF THE INVENTION

The conventional video signal recording/reproducing apparatus having the above-described constitution is attended by problem of the existence of the drop out of the video signals at the time of the changed speed reproduction in spite of employing the field memory, which makes it impossible to obtain visually favourable images.

Accordingly, it is a general object of the present invention to obviate the above-stated problem.

It is another object of the present invention to provide a video signal recording/reproducing apparatus capable of attaining high or changed speed reproduction which brings about no decrease in the signal-to-noise ratio and creates no fixed noise band.

In order to achieve the above-stated objects, the first embodiment of a video signal recording/reproducing apparatus in accordance with the present invention, take the form of a multichannel/multisegment recording system and is so constructed that a tape travelling speed at high speed reproduction is set to be (N+m/M) times as high as that in recording, wherein N=0, ±1, ±2, ..., and m and M are positive integers but have no common divisor except one.

In this embodiment, by selecting the tape travelling speed properly in changed speed reproduction, it is possible to obtain visually satisfactory pictures with no sharp drop in the signal-to-noise ratio and no fixed noise band.

The second embodiment of a video signal recording/reproducing apparatus in accordance with the present invention takes the L-channel/S-segment recording system and reproduces information from a record medium by moving the medium at travelling speed (N+1/L) times as high as that in recording, wherein N=0, ±1, ±2, ...

The third embodiment of a video signal recording/reproducing apparatus according to the present invention takes the form of the one-channel/multisegment recording system and reproduces information from a record medium by moving the medium at a travelling speed an even-number of times as high as that in recording when the guard band is relatively narrow and at a travelling speed (N+½) times as high as that in recording when the guard band is relatively wide, wherein N=0, ±1, ±2, ...

In order to achieve the above-stated objects, the fourth embodiment of a video signal recording/reproducing apparatus according to the present invention is arranged so that special reproduction heads are jointly used at the time of high speed reproduction, and that the special reproduction heads are disposed to scan positions deviating by a (n+½) track pitch, n being an integer, from the tracks scanned by ordinary reproduction. When high speed reproduction is effected, the special reproduction heads and the ordinary heads are changed over at a constant period, thereby obtaining reproduced images without any sharp decrease in the signal-to-noise ratio and no fixed noise band.

The above and other objects and advantages of the invention will become apparent more fully hereinafter from a consideration of the following description presented in connection with the accompanying drawings wherein some embodiments are illustrated by way of examples.

BRIEF DESCRIPTION OF THE DRAWINGS

FIGS. 6(a) to 6(g) illustrate another mode of operation of the apparatus shown in FIG. 4;

FIGS. 8(a) to 8(e) illustrate an operation of the apparatus shown in FIG. 7;

In these figures, like elements or parts are designated by the same reference numerals or symbols.

DESCRIPTION OF THE PREFERRED EMBODIMENTS

Figure 1:
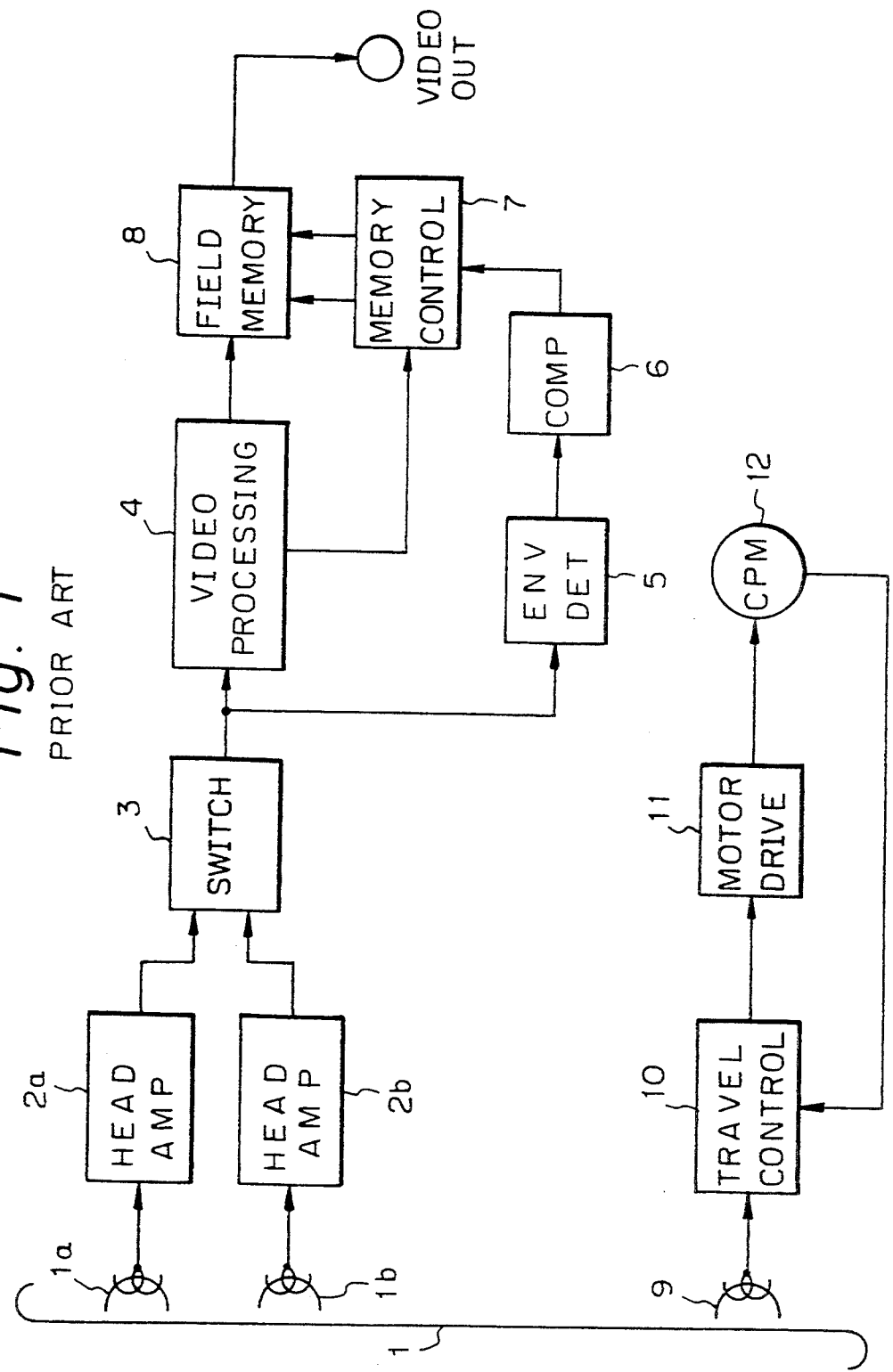
FIG. 1 is a block diagram of a video signal recording/reproducing apparatus which adopts a conventional one-channel/one-segment recording system.
Figure 2A:
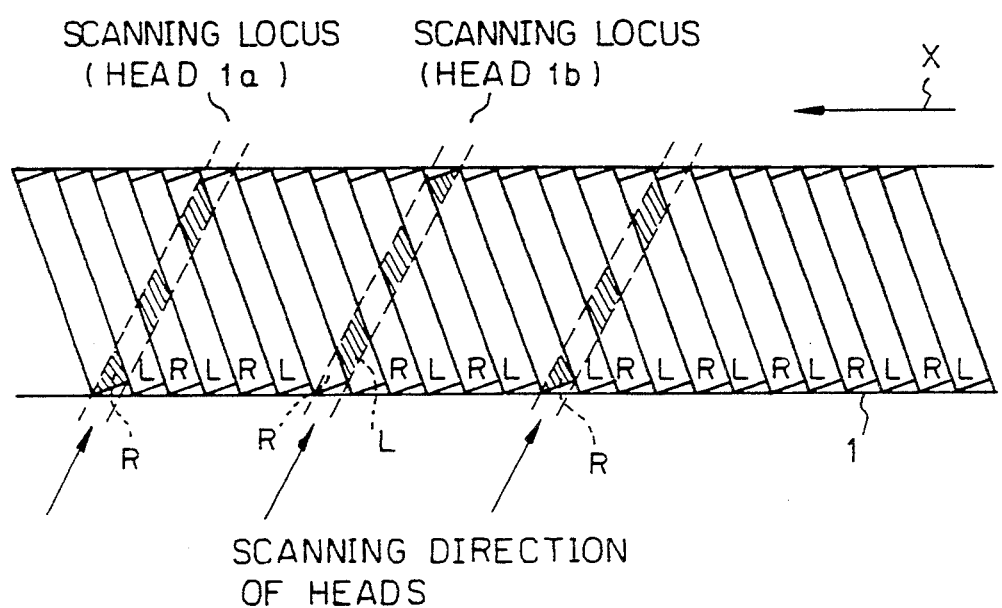
FIGS. 2(a) and 2(b) illustrate the operation of the apparatus shown in FIG. 1.
Figure 2B:
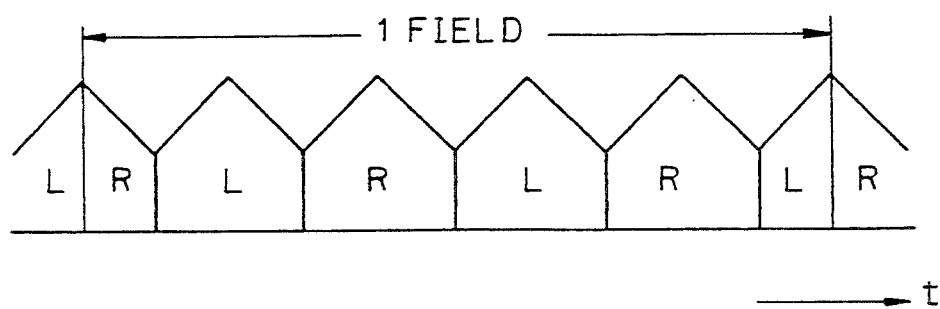
Figure 3A:
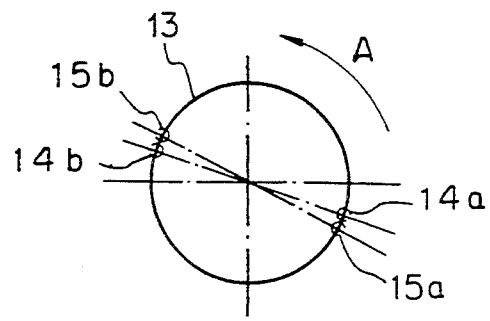
FIGS. 3(a) to 3(d) show the concept of the two-channel/three-segment recording system.
Figure 3B:
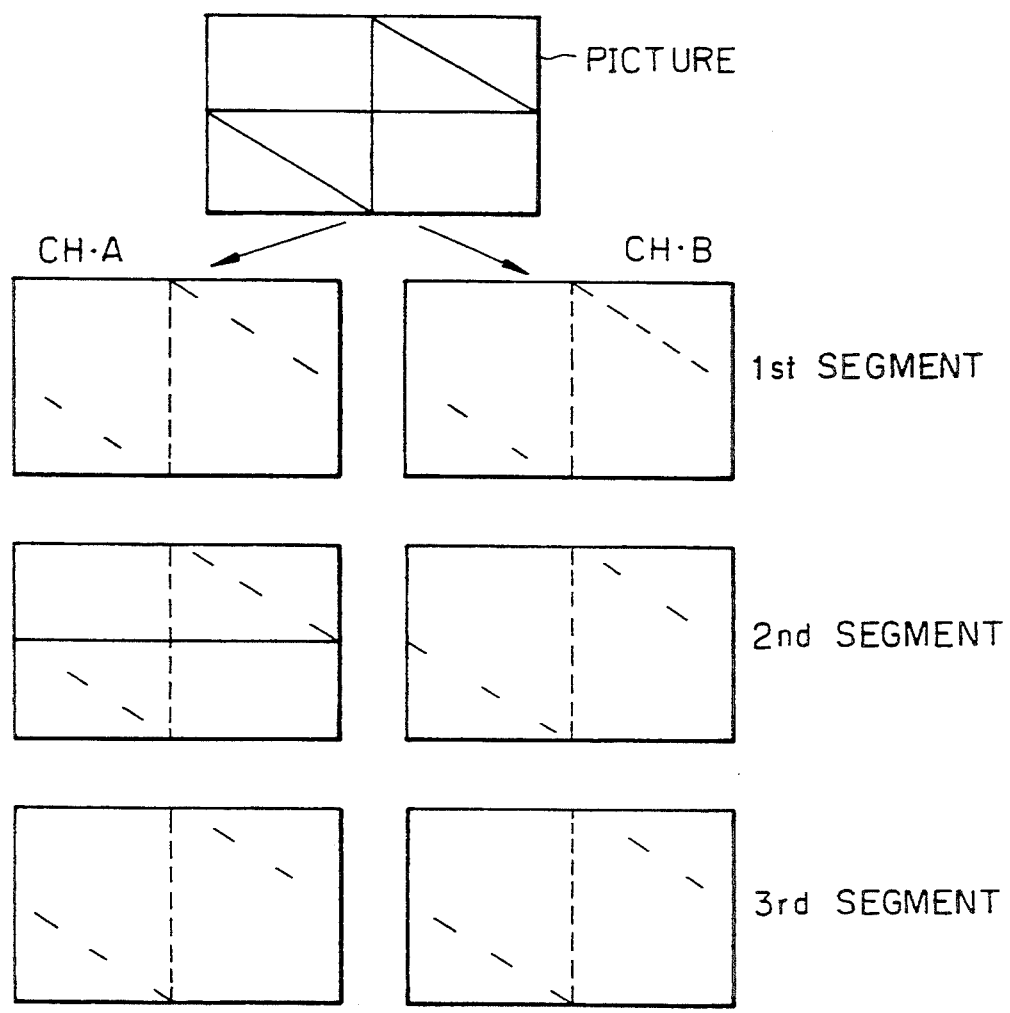
Figure 3C:
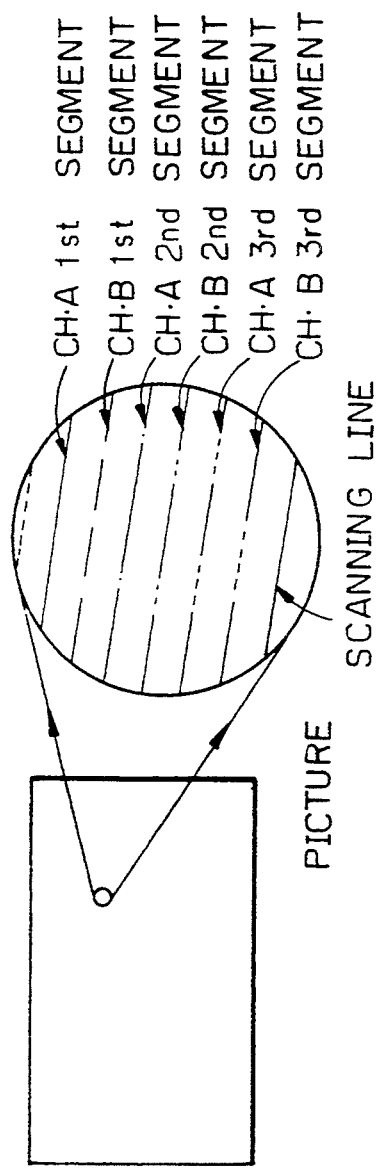
Figure 3D:
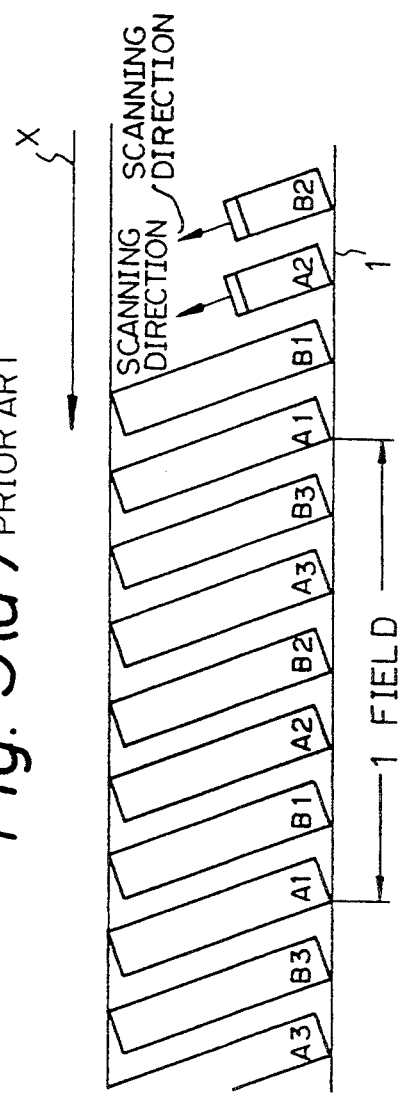
Figure 4:
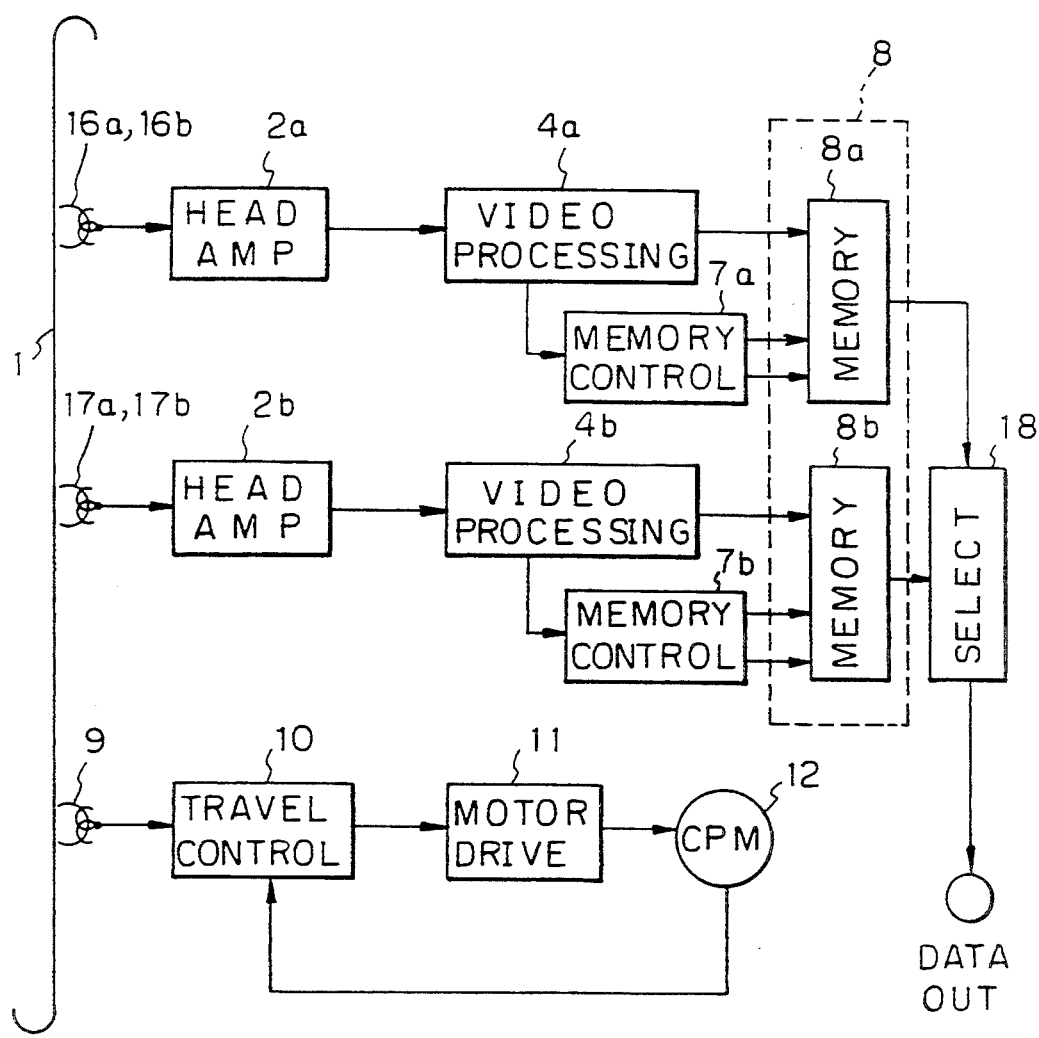
FIG. 4 is a block diagram of another conventional video signal recording/reproducing apparatus which adopts the multichannel/multisegment recording system.
Figure 5A:
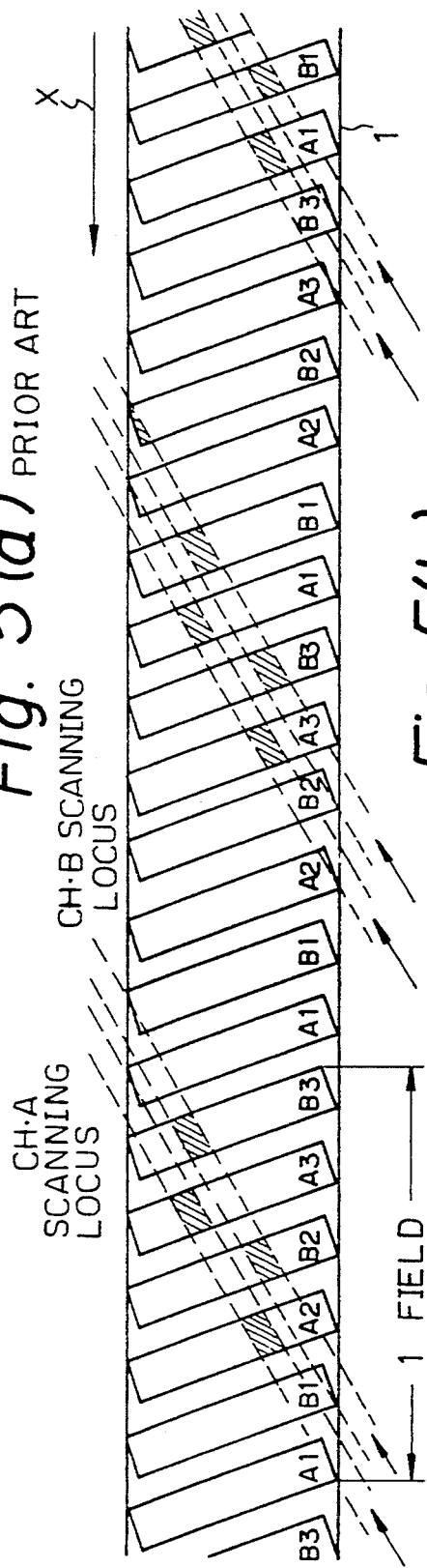
FIGS. 5(a) to 5(c) illustrate one mode of operation of the apparatus shown in FIG. 4 when the two-channel/three-segment recording system is employed.
Figure 5B:
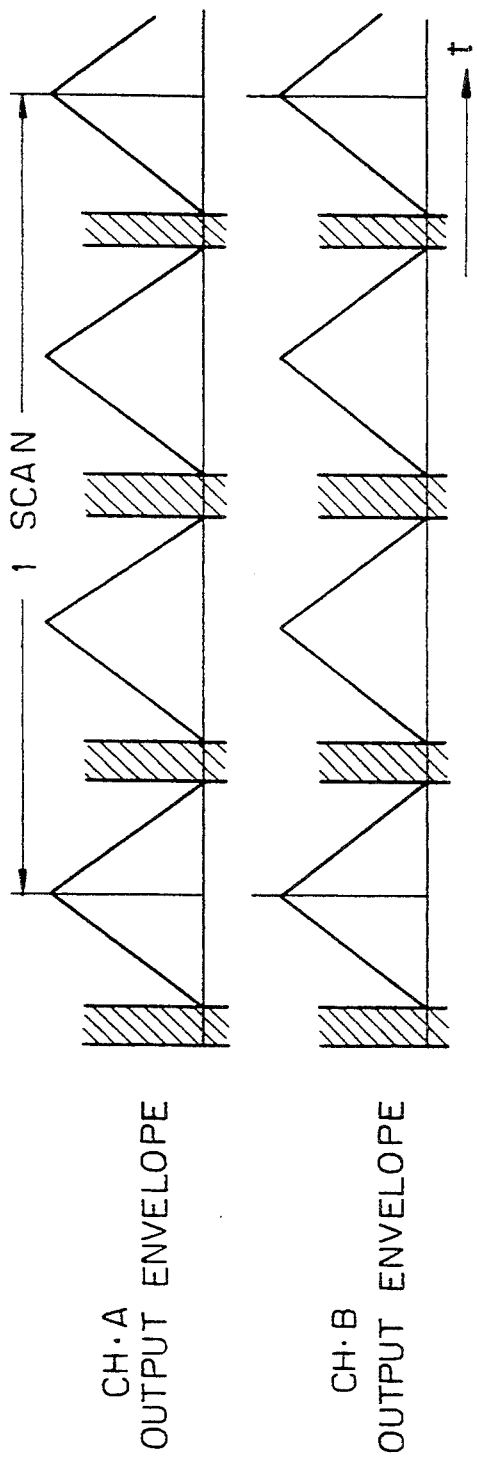
Figure 5C:
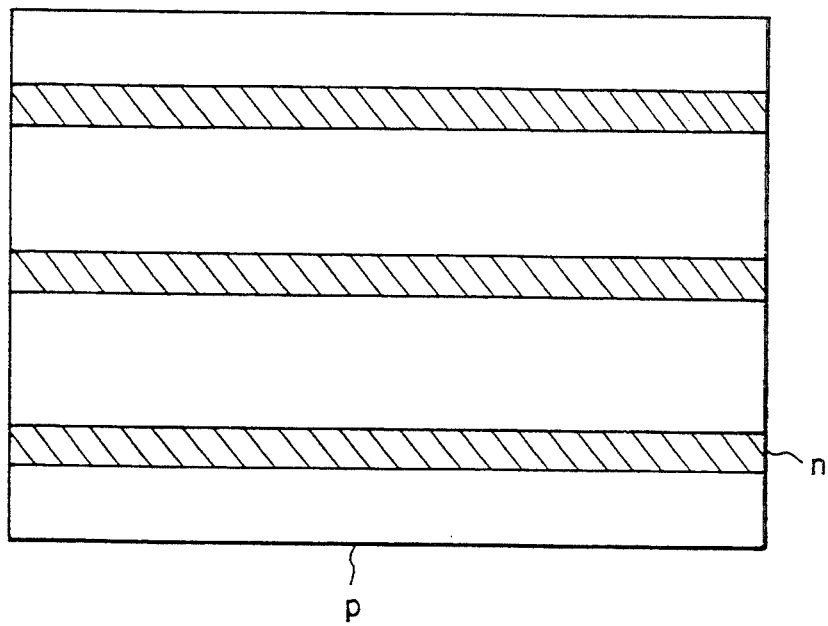
Figure 6A:
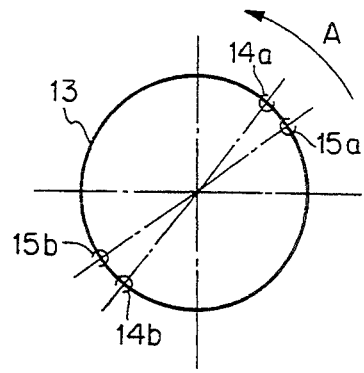
Figure 6B:
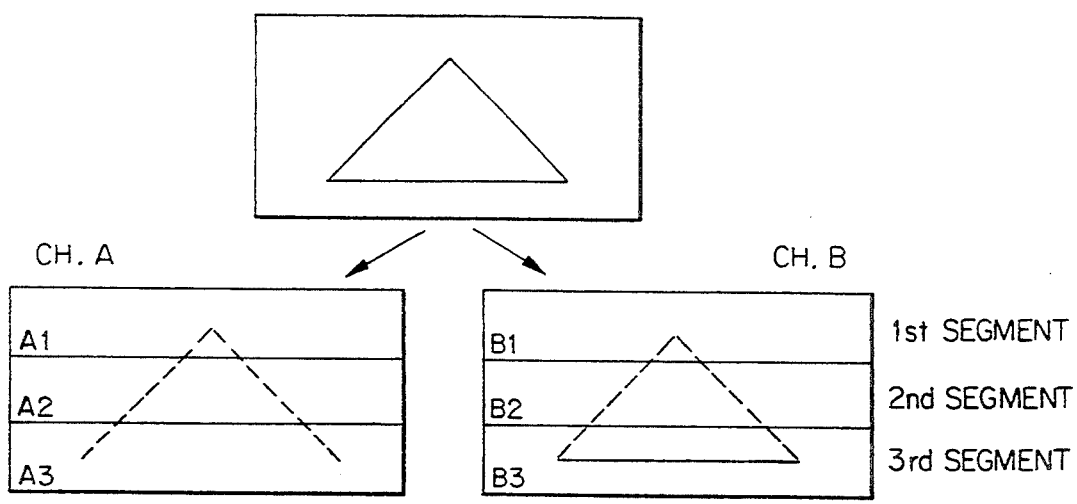
Figure 6C:
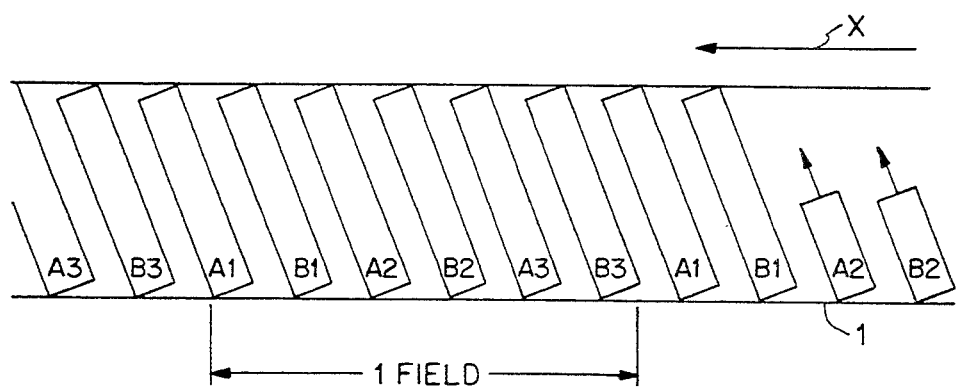
Figure 7:
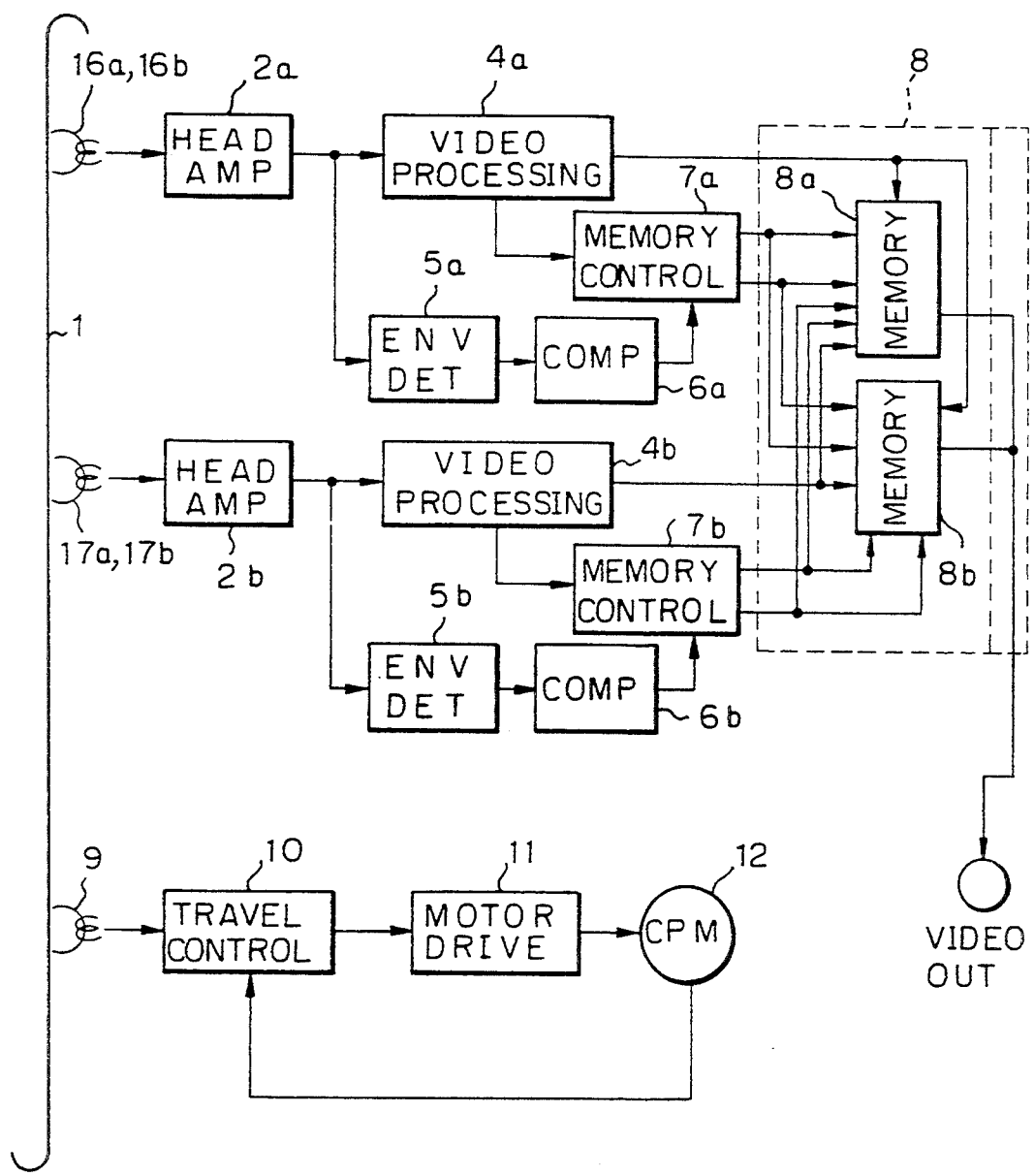
FIG. 7 is a block diagram of the first embodiment of a video signal recording/reproducing apparatus according to the present invention.

FIG. 7 shows the first embodiment of a video signal recording/reproducing apparatus according to the present invention. In this figure, the same reference symbols are used to designate like elements shown in FIG. 4. In this embodiment, the amplified video signals from video amplifier 2a are fed to an envelope detecting circuit 5a where the envelopes are detected.

The outputs of the envelope detecting circuit 5a are sent to a comparator 6a which compares the envelope of the signals with a predetermined signal level. The resulting comparison signal is emitted and given to a memory control circuit 7a. The memory control circuit 7a performs write-control to field memory 8 on the basis of the synchronization signals emitted from the video signal processing circuit 4a and the outputs of the comparator 6a, and further performs read-control in asynchronism with the synchronization signals.

An envelope detecting circuit 5b, a comparator 6b and a memory control circuit 7b are constructed in the same manner as the envelope detecting circuit 5a, the comparator 6a and the memory control circuit 7a.

The operation of the first embodiment shown in FIG. 7 will be explained by taking one example in which the two-channel/three-segment recording system is adopted and the tape travelling speed is so set as to be $(3+\frac{1}{4})$ times as high as that in recording.

Figures 8A, 8B, 8C:
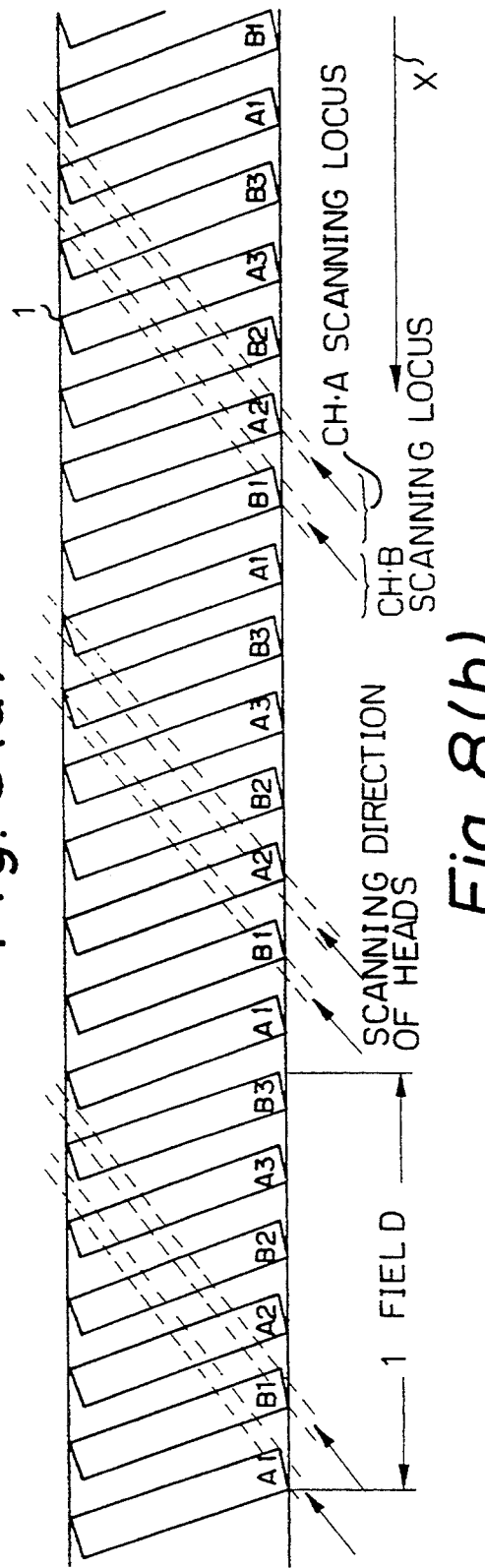

FIG. 8(a) shows the relation between the recording tracks and the head scanning loci. Assuming that the heads for CHs. A and B have the same azimuth angle, no azimuth effect appears, and the video signals of all the tracks that the heads have traversed can be reproduced. Directing attention to the reproduced output of CH. A, the reproduced output envelopes are obtained as illustrated in FIG. 8(b). While on the other hand, as can be seen in the portions indicated by the oblique lines in the figure, there exist some sections in which a portion of information recorded by the heads 16a and 16b and a portion of information recorded by the heads 17a and 17b are simultaneously read. The satisfactory reproduced video outputs cannot be obtained in these sections.

In order to avoid such a superimposition, the adjustment of the guard band width and the outputs of the comparators 6a and 6b is adequately made.

Turning attention now to the outputs of CH. A during the period of two scannings, the output envelopes of the adjacent two periods of one scanning are positioned to interpolate each other. The good outputs without any drop out in the video signal are, as illustrated in FIG. 8(c), gained when forming the video information for one track by making use of the output envelopes during the period of two scannings.

The reading process from the field memory 8 is effected in asynchronism with the writing process. As shown in FIG. 8(c), the output level of the reproduced video signals stored in the field memory 8 is relatively large, and the signal-to-noise ratio of the video signals to be read out is not so deteriorated that the pictures are difficult to distinguish. Since all the data stored in the field memory 8 are rewritten during the period of two fields, it is possible to actualize the desirable high speed reproduction without any fixed noise band.

When only one channel is used, it follows that the contents of the field memory are rewritten in the cycle of four fields.

Turning attention now to the output from, for instance, CH. A, FIG. 8(d) illustrates envelopes of CH. A for the period of four fields on the basis of the relation, as shown in FIG. 8(a), between the track patterns and the scanning loci of the heads. The portions drawn by the oblique lines indicate the output envelopes of the first segment A1 of CH. A. Reformation of these envelopes leads to the image signals shown in FIG. 8(e). It can be understood from FIG. 8(e) that a similar performance can be obtained simply by using one channel. As a result of this, it is possible to provide the effect of simplifying the processing of the signals written in the field memory 8.

It is to be noted that the same effects can be obtained by properly selecting the tape travelling speed to be $(N+m/M)$ times as high as that in recording when using the multichannel/multisegment recording system. It is also to be noted that an effect similar to that in the case of the heads having the same azimuth angle are exhibited in such a case where each head has an azimuth angle which differs in every channel.

In these cases, the following conditions should be met:

$N=0, \pm1, \pm2, \pm3, \ldots;$ $M=2, 3, 4, \ldots;$ $m=1, 2, 3, \ldots;$ $M>m;$ and M and m have no common divisor except one.

The tape travelling speed should be determined so that there exists no integer r which satisfies the following equation:

$$\left(N + \frac{m}{M}\right) \times M \times k = r \times S$$

S: the number of the segments, equal to or greater than two

N: integer

M: 2, 3, 4, ...

m: 1, 2, 3, ... M>m k: 1, 2, 3, ... S−1.

If the respective channels have the same azimuth angle, the following condition in addition to the above-described conditions must be satisfied. Let the number of the channels be L, an integer M should be determined so that M is not equal to L. Moreover, M should be determined so that M and L have no common divisor except one when M is smaller than L.

The following is the reason why such a restriction is imposed on the determination of the tape travelling speed. In the VTR which adopts the S-segment recording system, the contents in the field memory are rewritten in the cycle of M fields in reproduction at a speed $(N+m/M)$ times as high as that in ordinary reproduction. If the above-mentioned conditions are met [namely, if there exists a natural number r satisfying the equation $$\left(N + \frac{m}{M}\right) \times M \times k = r \times S],$$

the rewritten cycle comes to kM/S, M being larger than kM/S, and a return to the initial state is made before all the contents of the image signals are rewritten. Consequently, the fixed noise bands are produced, and any good reproduced pictures can not be acquired in the changed speed reproduction. If all the heads have the same azimuth angle, the video signals are superimposed on each other, as stated before, and the output envelopes are obtained as shown in FIG. 8(b). When determining M so that L is equal to M, the position in which the favourable envelope is emitted retains unchanged for every sequential scanning period, whereby drop out occurs in the video signals depicted with the oblique lines. As a result, the fixed noise bands appear, and hence any satisfactory reproduced pictures cannot be obtained in the changed speed reproduction.

In the first embodiment, one example has been explained in which the reproduction speed is $(3+\frac{1}{2})$ times the recording speed and the two-channel/three-segment recording system is adopted. Although the demonstration is omitted, in the high speed reproduction having the heads of the same azimuth angle and taking the multichannel/multisegment, multichannel/one-segment, and one-channel/multisegment recording system, if the tape travelling speed satisfies the aforementioned condition, and when the following formula is established, $$M = 2 \times L$$

wherein L is the number of channels, the high speed reproduction can be carried out and brings about similar effects.

Figure 9:
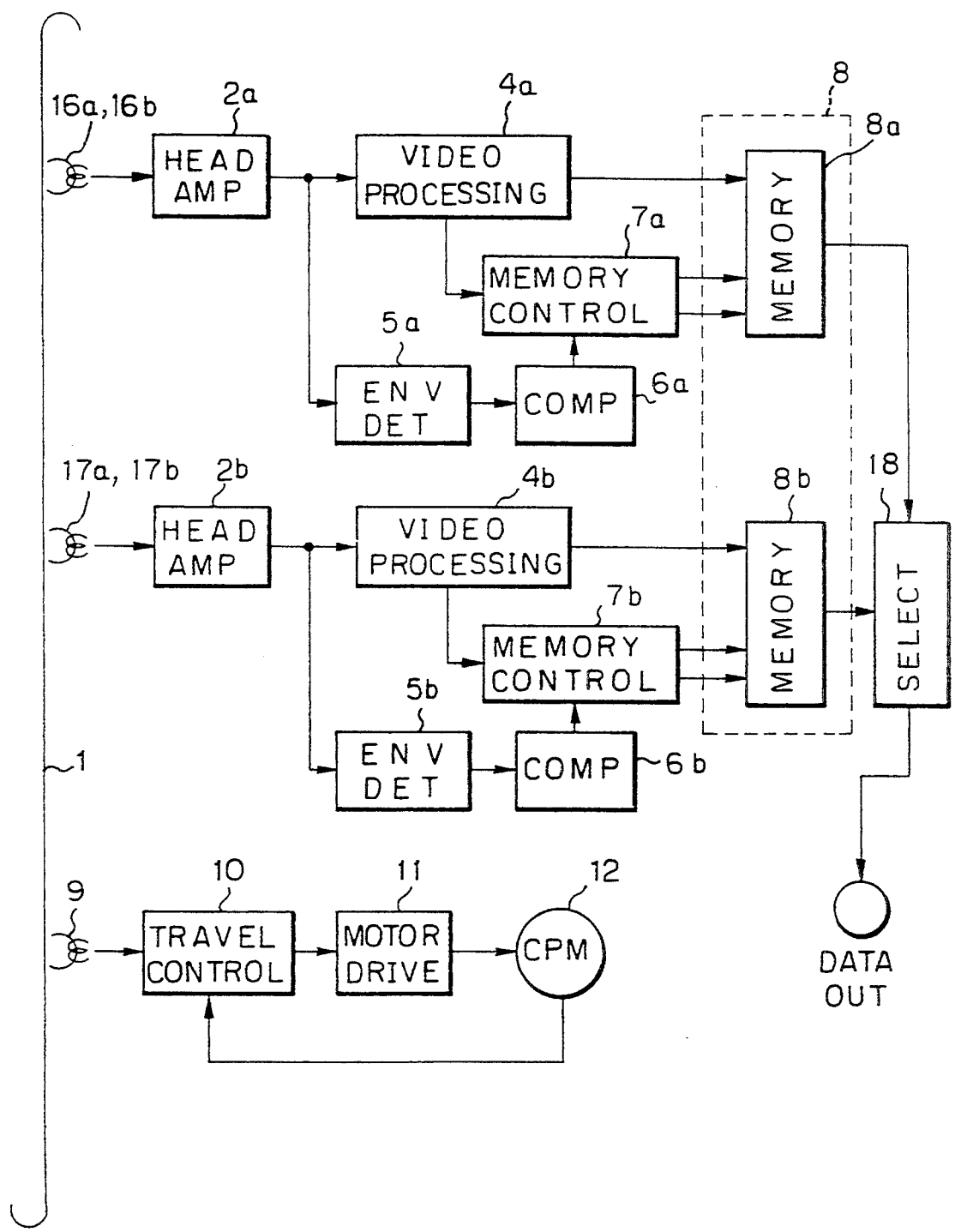
FIG. 9 is a block diagram of the second embodiment of a video signal recording/reproducing apparatus according to the present invention.

Referring now to FIG. 9, the second embodiment of a video signal recording/reproducing apparatus according to the present invention is shown. In this figure, like elements are designated by the same reference numerals and symbols as used in FIGS. 4 and 7, and the description is therefore omitted herein.

Now, the operation of the apparatus will be explained by taking one example in which the tape travelling speed is so set as to be $(3+\frac{1}{2})$ times as high as that in recording and the two-channel/three-segment recording system is adopted. In this example, a pair of heads 16a and 16b and a pair of heads 17a and 17b have different azimuth angles, respectively.

Figure 10A:
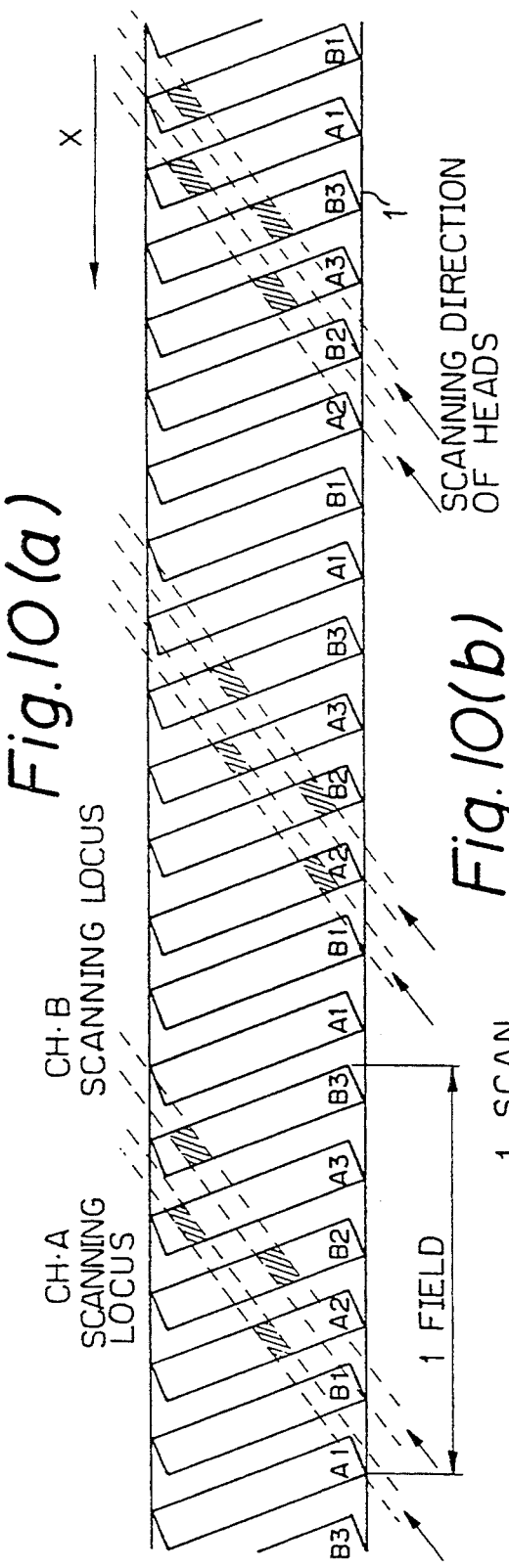
FIGS. 10(a) to 10(d) illustrate one mode of operation of the apparatus shown in FIG. 9.
Figure 10B:
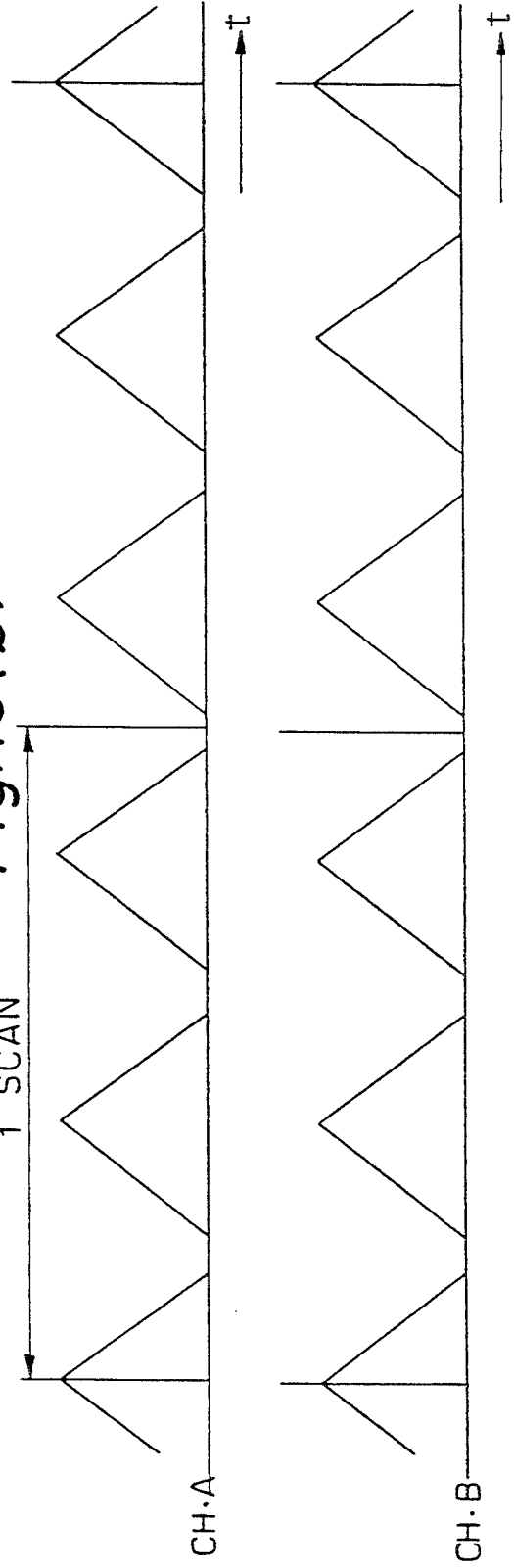
Figure 10C:
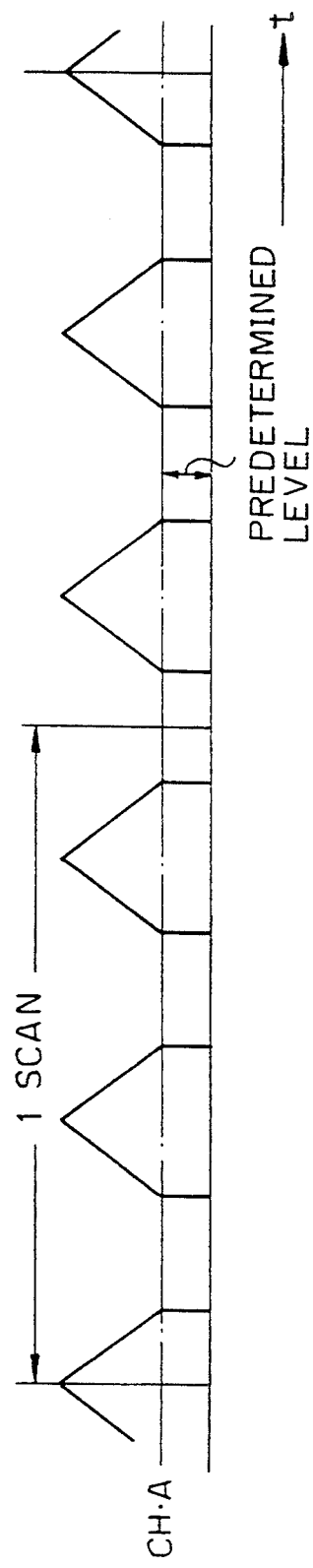
Figure 10D:
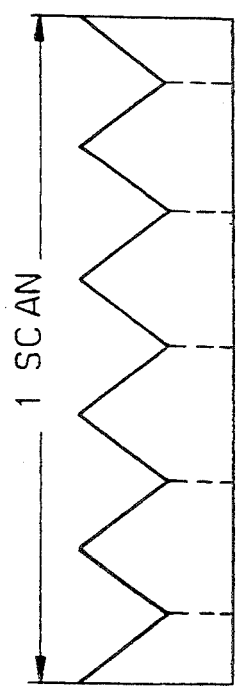

FIG. 10(a) shows the relation between the recording tracks and the head scanning loci. Since CHs. A and B have the different azimuth, the envelopes as shown in FIG. 10(b) are emitted by virtue of the azimuth effect. In this case, the output envelopes for two adjacent periods of one scanning are positioned to interpolate each other. At this time, the output level of the comparators 6a and 6b as well as the guard band width is properly adjusted, thereby obtaining the output envelopes shown in FIG. 10(c). The satisfactory outputs without any drop in the video signal are gained as illustrated in FIG. 10(d), when forming the video information included in one track by using the output envelopes for the period of two scannings.

The reading operation from the field memory 8 is executed in asynchronism with the writing operation. As illustrated in FIG. 10(d), the output level of each reproduced video signal stored in the field memory 8 is relatively high, and the signal-to-noise ratio of the video signal to be read out is not deteriorated to the extent that the picture is difficult to distinguish. All the data stored in the field memory 8 are rewritten for the period of two fields, and the high speed reproduction without any fixed noise band can therefore be attained.

Here, explanation will be made about a video signal recording/reproducing apparatus in the third embodiment which takes the one-channel/multisegment recording system. The construction of the apparatus is the same as that illustrated in the block diagram of FIG. 9, and hence the description thereof is omitted. The two heads used in this case have different azimuth angles.

The operation will be explained by taking one example in which the tape travelling speed is four times that in recording.

Figure 11A:
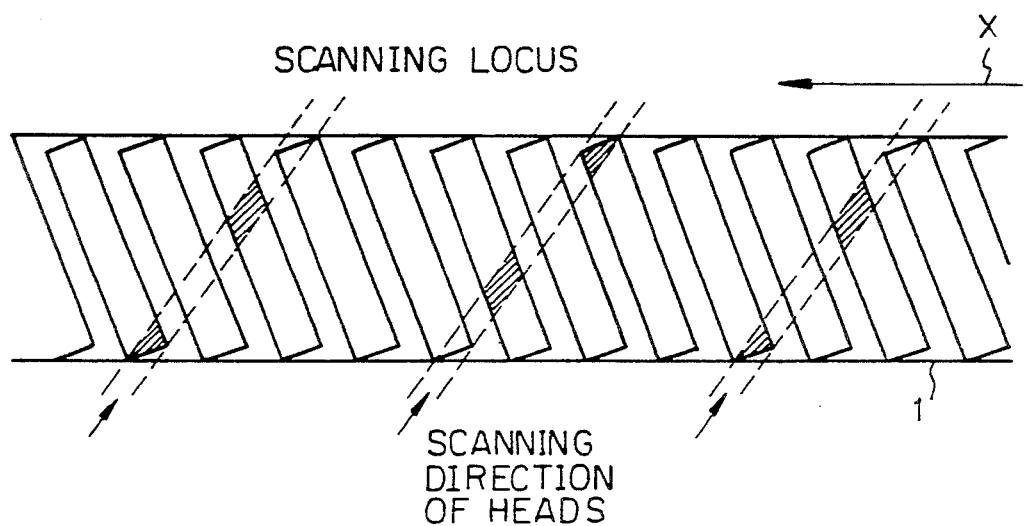
FIGS. 11(a) to 11(c) illustrate one mode of operation of the third embodiment of a video signal recording/reproducing apparatus according to the present invention.
Figure 11B:
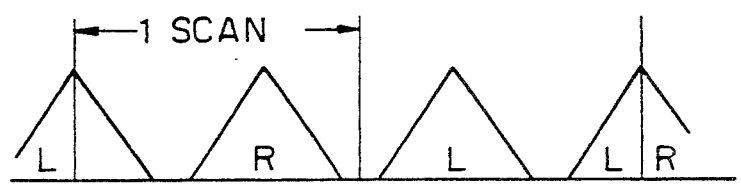
Figure 11C:

As described already, the relation between the recording tracks and the scanning loci of the heads becomes the one illustrated in FIG. 11(a). In the figure, the signs R and L indicate the portions recorded by the heads each having a different azimuth angle. Since the heads of CHs. A and B have different azimuth angles, only the portions depicted with the oblique lines are reproduced by virtue of the azimuth effect. The output envelopes for the period of two scannings which are shown in FIG. 11(b) are similar to those shown in FIG. 10(b). Also in this case, the adjacent output envelopes are positioned to interpolate each other. At this time, the video information for one track is formed by properly adjusting the output level of the comparators 6a and 6b as well as the guard band width, thereby obtaining, good outputs without any drop out in the video signal, as shown in FIG. 11(c).

As the guard band width increases, the signal-to-noise ratio is extremely deteriorated in spite of the interpolation, because the outputs from the portions between adjacent envelopes are considerably small.

Figure 12A:
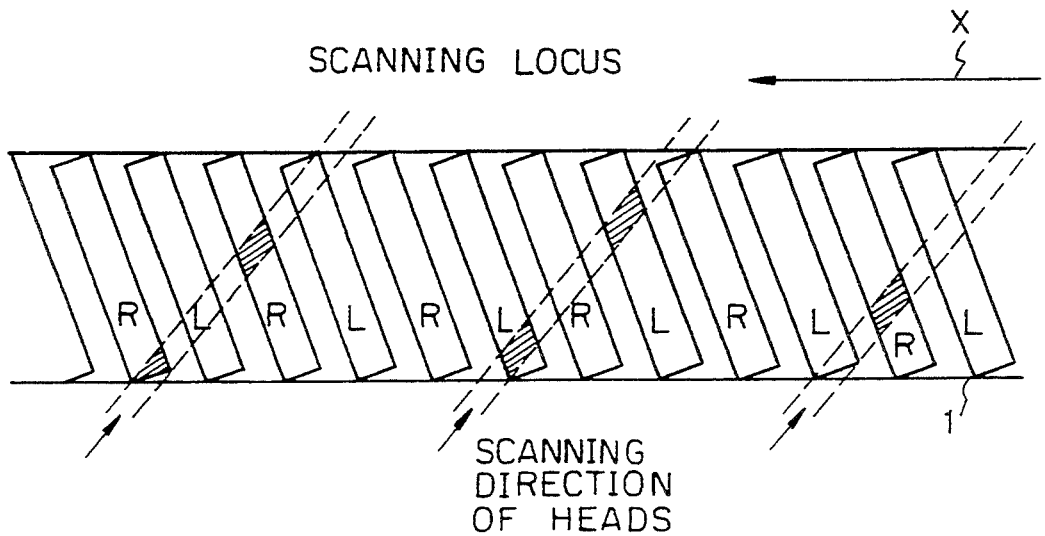
FIGS. 12(a) to 12(c) illustrate another mode of operation of the third embodiment.
Figure 12B:
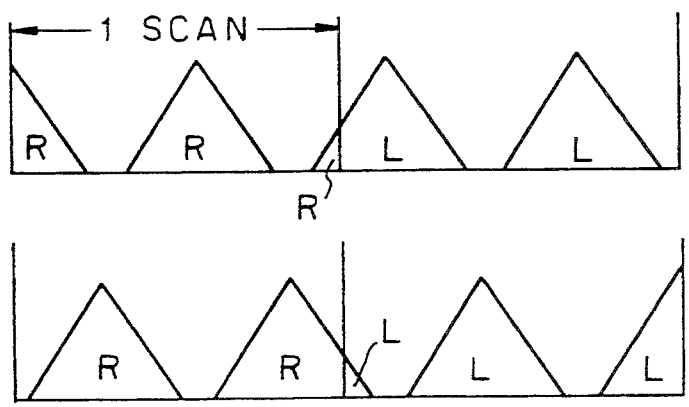
Figure 12C:

In order to avoid such deterioration in the signal-to-noise ratio in the case of a relatively large guard band width, the tape travelling speed is set to be $(4+\frac{1}{2})$ times as high as that in recording. In this case, the relation between the recording tracks and the scanning loci of the heads is shown in FIG. 12(a), which is similar to that shown in FIG. 11(a). Since the heads of CHs. A and B have different azimuth angle, the portions shown by the oblique lines are therefore reproduced owing to the azimuth effect. The output envelopes for the period of four scannings are illustrated in FIG. 12(b). The output envelopes for this period are likewise positioned to interpolate each other. The video information for one track is formed by properly adjusting the outputs of the comparators 6a and 6b. As a result, the satisfactory outputs whose level is relatively large are obtained, as illustrated in FIG. 12(c), without omission of any video signal.

The readout from the field memory is effected in asynchronism with the writing operation. When the guard band width is relatively small, the tape travelling speed is set so as to be four times as high as that in recording, whereby the output level of the video signals stored in the field memory is relatively large as shown in FIG. 11(c). In addition, the signal-to-noise ratio of the video signal to be read out is not so deteriorated that the picture becomes difficult to distinguish.

When the guard band is relatively large, the tape travelling speed is set to be $(4+\frac{1}{2})$ times as high as that in recording. In consequence, the output level of the reproduced video signals stored in the field memory is, as shown in FIG. 12(a), relatively large, and the signal-to-noise ratio of the video signal to be read out is not so deteriorated that the picture becomes difficult to distinguish.

All the data in the field memory are rewritten in the cycle of two fields at the reproducing speed four times or $(4+\frac{1}{2})$ times the recording speed, so the good high speed reproduction without fixed noise band can be realized.

The explanations made in connection with the second and third embodiments lead to the following general conclusion: 1) where the multichannel/multisegment recording system (the number of the channels is hereinbelow referred to L) is adopted and the head for each channel has a different azimuth angle, the tape travelling speed should be set at $(N+1/L)$ times (N: 0, ±1, ±2, ±3, ±4, . . . ) as high as that in recording; and 2) where the one-channel/multisegment recording system is employed and two heads have different azimuth angles, the tape travelling speed should be set to be M times (M is an even number) as high as that in recording when the guard band is relatively narrow, and should be set to be (N+½) times (N: 0, ±1, ±2, . . . ) as high as that in recording when the guard band is relatively large.

Figure 13:
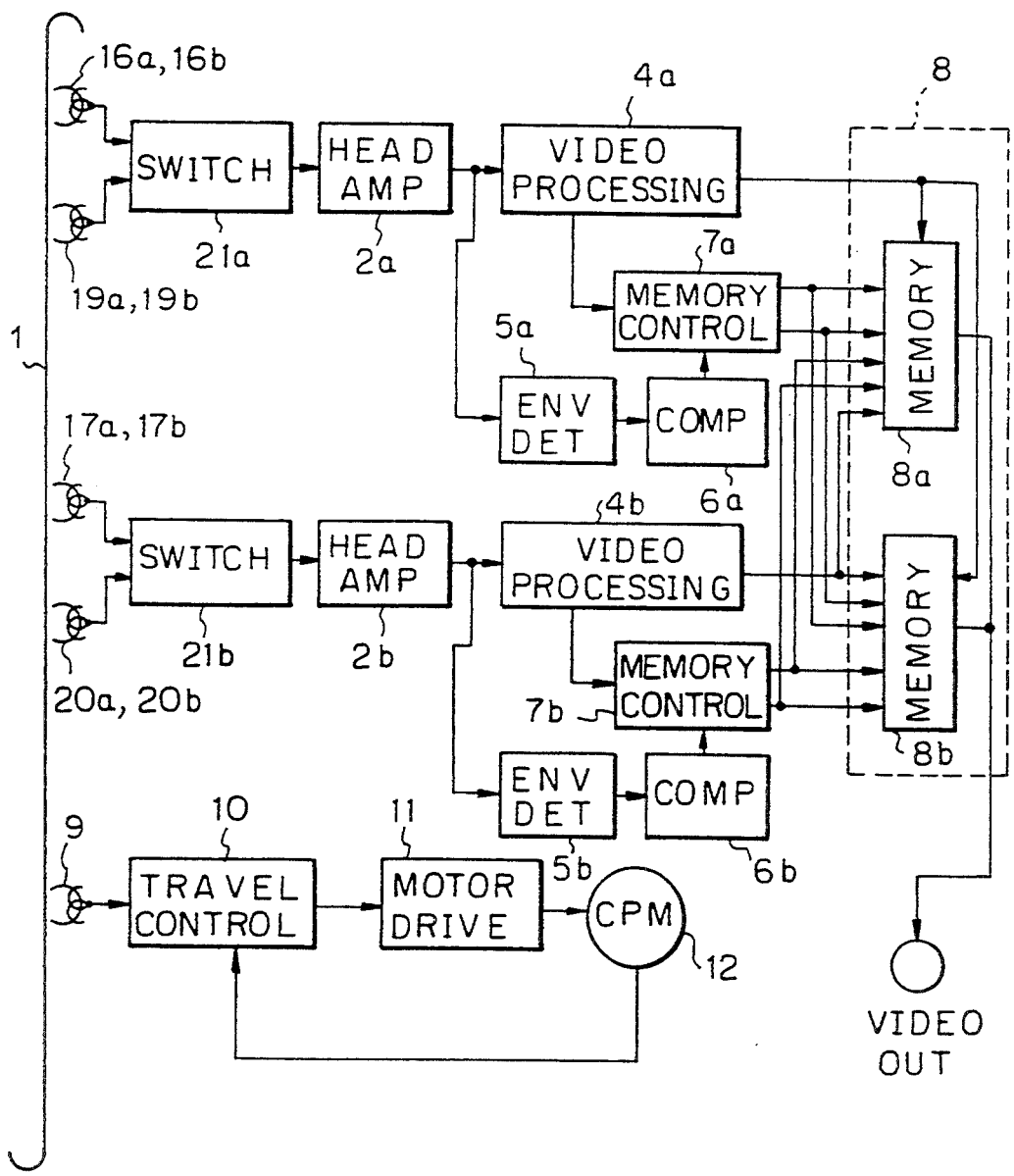
FIG. 13 is a block diagram of the fourth embodiment of a video signal recording/reproducing apparatus according to the present invention.

Referring now to FIG. 13, the fourth embodiment of a video signal recording/reproducing apparatus according to the present invention is shown in a block-diagramatic form. In this figure, like elements are designated by the same reference symbols as used in FIG. 7.

In FIG. 13, a pair of special reproduction heads 19a and 19b are provided and connected to a first head change-over switch 21a, and another pair of special reproduction heads 20a and 20b are provided and connected to a second head change-over switch 21b. Ordinary heads 16a, 16b and special reproduction heads 19a and 19b reproduce information on CH. A and ordinary heads 17a, 17b and special reproduction heads 20a and 20b reproduce information on CH. B.

Head change-over switch 21a serves to change over the signals at a constant period which are reproduced both by the ordinary heads 16a and 16b and by the special reproduction heads 19a and 19b at the time of special reproduction. Head change-over switch 21b similarly serves to change over the signals at a constant period which are reproduced both by the ordinary heads 17a and 17b and by the special reproduction heads 20a and 20b at the time of special reproduction.

Outputs of the head change-over switch 21a are transmitted to head amplifier 2a, while the outputs of the head change-over switch 21b are sent to head amplifier 2b.

FIG. 14 is a diagram illustrating a disposition of the heads used in the fourth embodiment of the present invention, and FIG. 15 is a diagram illustrating the operation of this embodiment.

Figure 14A:
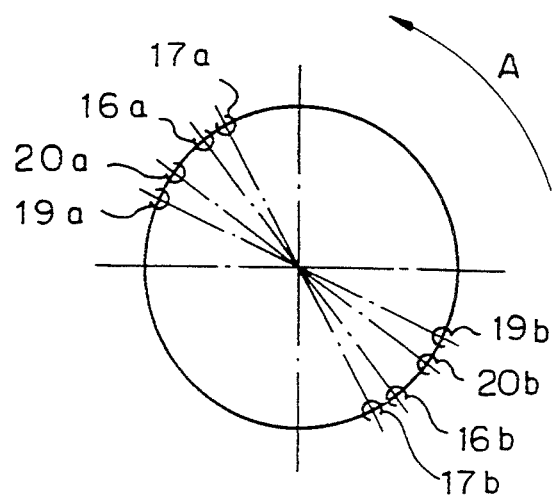
FIG. 14(a) shows the disposition of the heads used in the apparatus shown in FIG. 13.
Figure 14B:
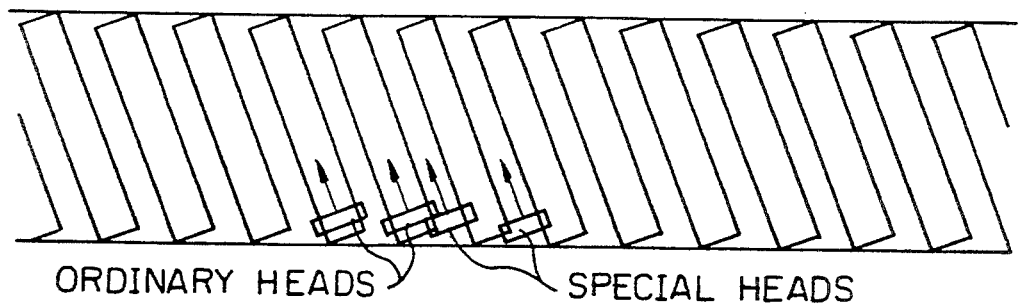
FIG. 14(b) shows how the heads are placed on the tracks in the apparatus shown in FIG. 13.
Figure 14C:
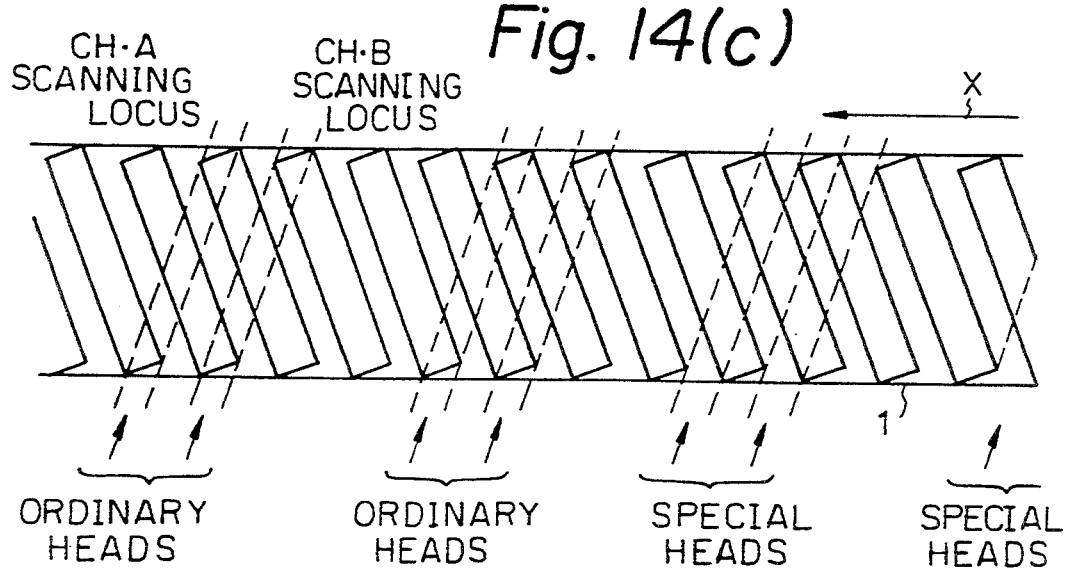

Now, the operation of the fourth embodiment of the present invention will hereinafter be described with reference to FIGS. 13 to 15. Each of the special reproduction heads 19a, 19b, 20a and 20b is, as illustrated in FIG. 14(a), disposed to scan the position deviating by a ½ track pitch from the track to be scanned by the corresponding ordinary heads, as shown in FIG. 14(b). Consequently, in a case where the ordinary heads 16a, 16b, 17a and 17b and the special reproduction heads 19a, 19b, 20a and 20b are changed over for every revolution of the rotary drum at the time of high speed reproduction, the relation between the track patterns and the scanning loci of the heads is the one illustrated in FIG. 14(c).

Figure 15A:
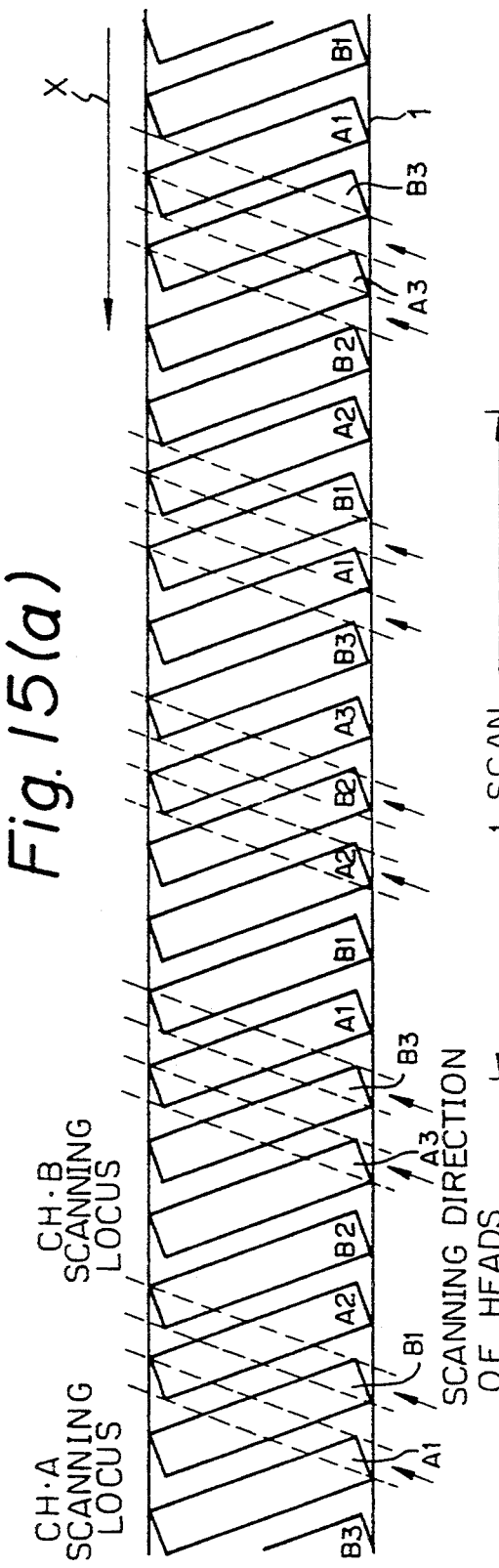
FIGS. 15(a) to 15(e) illustrate one mode of operation of the apparatus shown in FIG. 13.
Figure 15B:
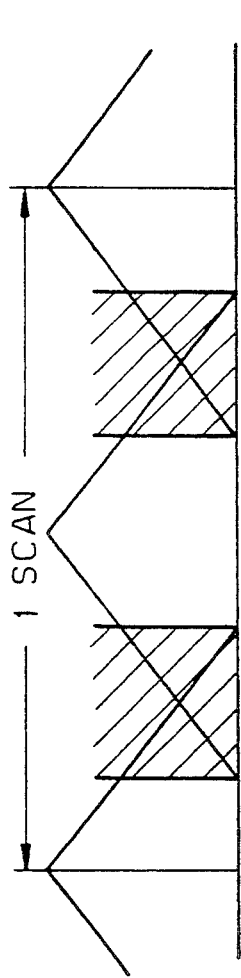
Figure 15C:
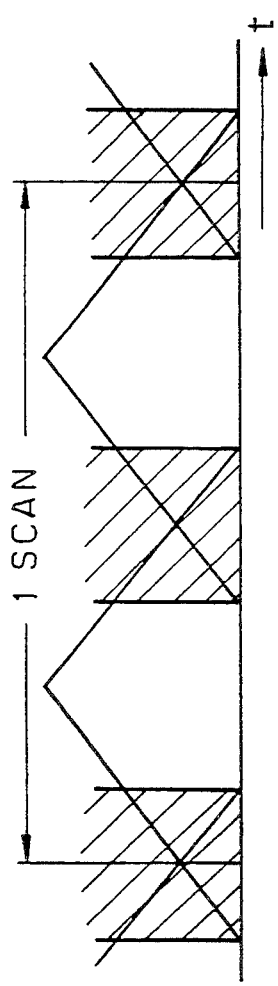

Now, an assumption is made that the tape travelling speed is twice as high as that in recording, and that the two-channel/three-segment recording system is employed. The ordinary heads 16a, 16b, 17a and 17b and the special reproduction heads 19a, 19b, 20a and 20b have the same azimuth angle. FIG. 15(a) shows the relation between the recorded tracks and the scanning loci of the heads. The reference signs A1, A2 and A3 designate the recorded tracks of CH. A, and B1, B2 and B3 designate the recorded tracks of CH. B. Every time the rotary drum makes one and a half revolutions (one field period), the special reproduction heads 19a, 19b, 20a and 20b and the ordinary heads 16a, 16b, 17a and 17b are changed over. Accordingly, the output envelope waveform as shown in FIG. 15(b) is obtained from the ordinary heads 16a, 16b, 17a and 17b, while the reproduction envelope waveform as shown in FIG. 15(c) is obtained by the special reproduction heads 19a, 19b, 20a and 20b. Since the ordinary heads and the special reproduction heads have the same azimuth angle, no azimuth effect appears. Therefore, the portions of the reproduced signals from the adjacent tracks are superimposed to each other, as depicted with oblique lines. The outputs of the comparators 6a and 6b and the guard band width should be properly adjusted in order to prevent such superimposition of the signals from occurring. The envelope outputs obtained by the ordinary heads and the special reproduction heads are in such a position that they interpolate each other.

Figure 15D:
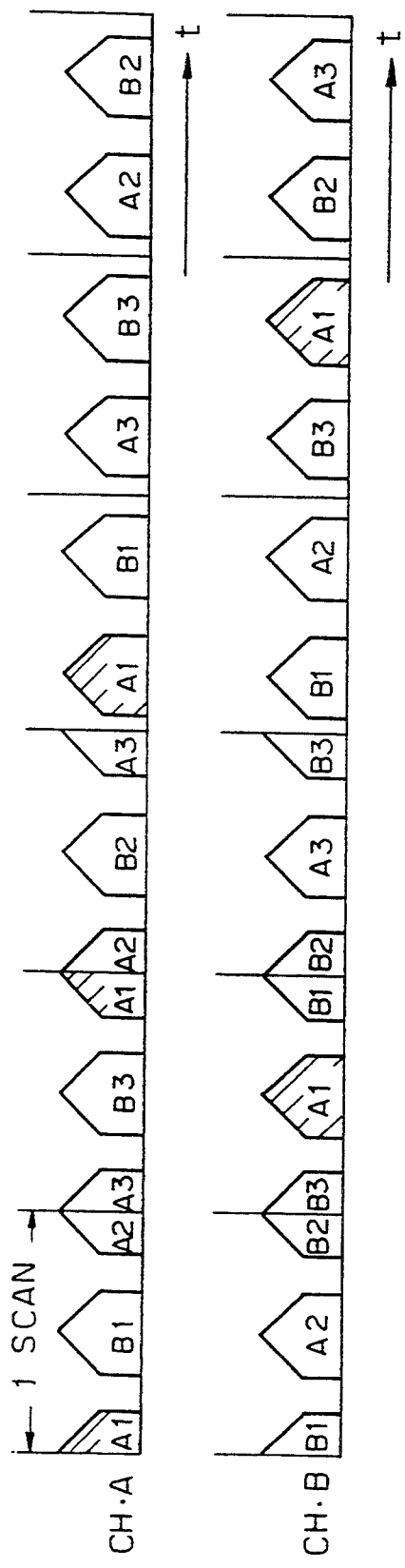
Figure 15E:
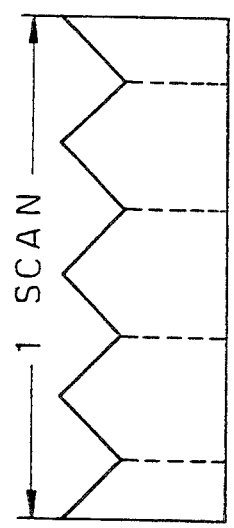

The output envelopes reproduced during the period of two fields and the track positions are illustrated in FIG. 15(d) in the light of the fact that the relation between the scanning loci of the heads and the track patterns is repeated in the cycle of two fields. In FIG. 15(d), the portions depicted with the oblique lines indicate the reproduced outputs from the tracks A1. When making reformation, the reproduced outputs without any drop out of the video signal can be obtained, as illustrated in FIG. 15(e).

The readout from the field memory 8 is executed in asynchronism with the writing operation. As shown in FIG. 15(e), the output level of each reproduced video signal stored in the field memory 8 is relatively large, and the signal-to-noise ratio of the video signals to be read is not so deteriorated that the picture is difficult to distinguish. All the data are rewritten once for every two fields, and hence no fixed noise band is created. This makes it possible to attain extremely satisfactory high speed reproduction.

In the fourth embodiment, the two pairs of special reproduction heads 19a, 19b, 20a and 20b are employed. The same effects can, however, be acquired by merely using two special reproduction heads 19b and 20b. Such a modification will be explained with reference to FIG. 16.

Figure 16A:
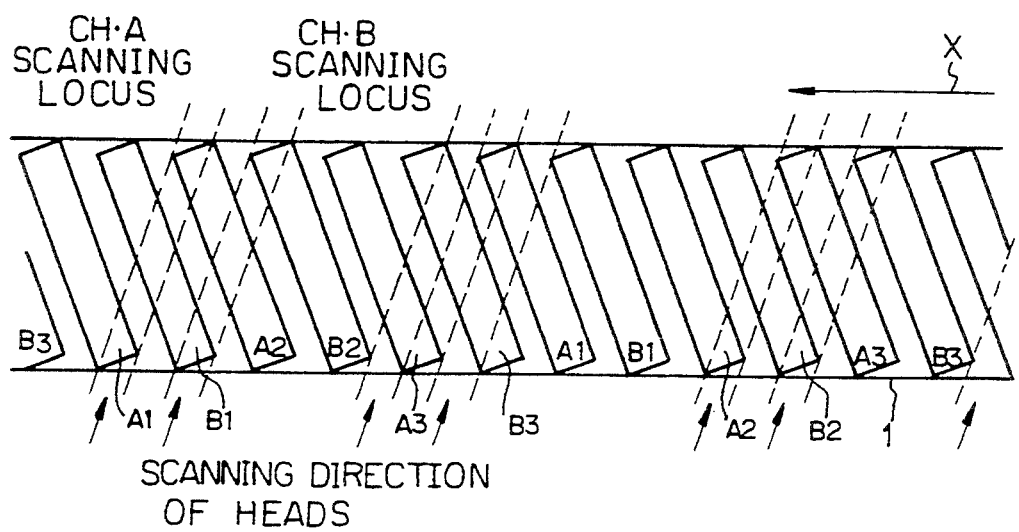
FIGS. 16(a) to 16(c) illustrate another mode of operation of the apparatus shown in FIG. 13.
Figure 16B:
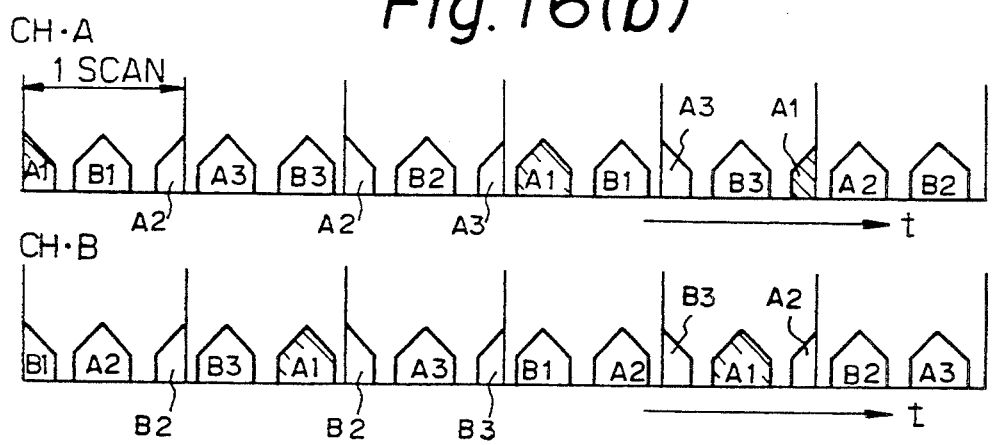
Figure 16C:
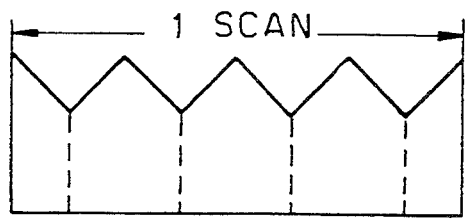

FIG. 16(a) shows the relation between the track patterns and the scanning loci of the heads. The ordinary heads 16a, 16b, 17a and 17b and the special reproduction heads 19b and 20b are changed over for every half revolution of the rotary drum. The output envelopes reproduced during the period of two fields and the track positions are illustrated in FIG. 16(b) in the light of the fact that the above-mentioned relation is repeated in the cycle of two fields. In FIG. 16(b), the portions shown by the oblique lines indicate the reproduced outputs from the tracks A1. When making the reformation, the reproduced outputs without any drop out of the video signal can be produced, as can be seen in FIG. 16(c). Hence, it is possible to exhibit the effects similar to those described in the embodiment of FIG. 13 only by employing two special reproduction heads 19b and 20b.

The fourth embodiment has been explained as one example of the case where the two-channel/three-segment recording system is adopted and the reproduction is made at double the recording speed. It is, however, possible to provide the same effects even when information recorded in the multichannel/multisegment system is reproduced at a speed more than double the ordinary reproduction speed and the special reproduction heads are disposed to scan the positions deviating by a track pitch of a (½+n) track pitch, n being an integer, from the track to be scanned by the corresponding ordinary heads.

It should be noted that similar effects can also be acquired in a case where the multichannel/one-segment recording system or the one-channel/multisegment recording system is adopted.

In the above-described fourth embodiment, the heads are changed over for every period of one field. It is, however, possible to obtain good reproduced images without a noise band by switching the heads for every one rotation or every one and a half rotations of the heads.

On this point, it is to be noted that when a tape travelling speed is determined to be M times the ordinary reproduction speed, M being an integer, so that there is no integer r which satisfies the following equation:

$$M \times k = r \times S$$

wherein S: the number of the segments, larger than two k: 1, 2, 3, ..., S−1.

This condition restrictive to the determination of the tape travelling speed is attributed to the following reason. In the changed speed reproduction of the VTR which takes the S-segment recording system, the contents stored in the field memory are in general rewritten in the cycle of two fields. When the above-described condition is satisfied, that is, when there exists such as integer r that satisfies the equation $M \times k = r \times S$, however, the rewrite cycle comes to 2k/S (2>2k/S), and a return to the initial state is made before all the contents of video signals in the field memory are rewritten. As a result of this, the fixed noise bands are produced, and any satisfactory images cannot be obtained in the changed speed reproduction.

In the fourth embodiment, similar effects have been obtained by use of two special reproduction heads, one corresponding to CH. A and the other corresponding to CH. B, in the case where the two-channel/three-segment recording system is employed. It is also possible in the case of the multichannel recording system, to obtain satisfactory reproduced images with no fixed noise band by providing the special reproduction heads the number of which is equal to that of the channels, viz., each of which corresponds to each of the channels.

Figure 17A:
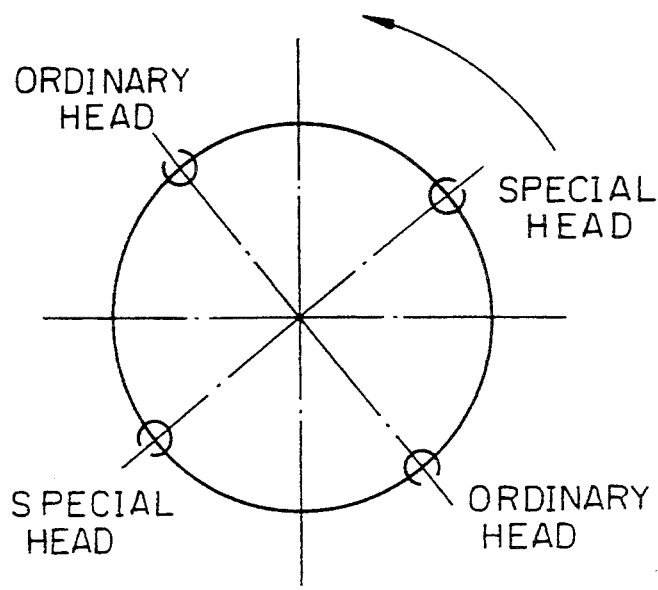
FIGS. 17(a) and 17(b) show another example of the disposition of the heads used in the apparatus shown in FIG. 13.
Figure 17B:
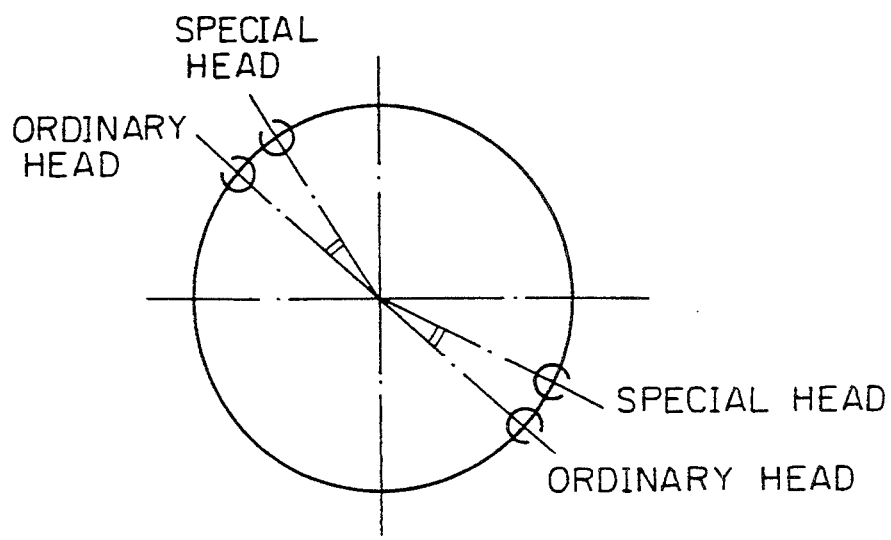

In the description given above, the ordinary heads 16a, 16b, 17a and 17b and the special reproduction heads 19a, 19b, 20a and 20b are disposed in such a way as illustrated in FIG. 14(a). If the foregoing conditions are met, similar effects can be obtained by the ordinary heads and special reproduction heads placed in such manners as shown in FIG. 17(a) and 17(b).

The invention has been described in detail with particular reference to certain preferred embodiments thereof, but it will be understood that variations and modifications can be effected within the spirit and scope of the invention.

What is claimed is:

1. A video signal recording and reproducing apparatus, wherein a video signal of at least one field period is recorded on a plurality of tracks on a recording medium in an L-channel/S-segment recording system, L and S being respectively positive integers which are never simultaneously equal to one, said apparatus comprising:
   at least one rotating reproduction head provided for each of the L-channels for reproducing a video signal on said recording medium;
   processor means coupled to said rotating reproduction head for demodulating the video signal reproduced by said rotating reproduction head, and for outputting the demodulated video signal;
   storing means for storing the demodulated video signal output from the processor means;
   storage control means for controlling said storing means so that the demodulated video signal is written in said storing means in synchronism with a synchronization signal detected from the reproduced signal and so that the stored demodulated video signal is read out in asynchronism with the detected synchronization signal; and
   recording medium travel control means for selecting a traveling speed of said recording medium so that in case of high speed playback, said recording medium travel control means selects the traveling speed of said recording medium to be (N+m/M) times a recording speed, being equal to 0, ±1, ±2, ±3, . . . , and m and M being positive integers having no common divisor except one and so that no integer r exists which satisfies the equation $(N+m/M) \times M \times k = r \times S$, wherein k = 1, 2, 3, . . . , S−1 and M>m.

2. A video signal recording and reproducing apparatus, wherein a video signal of at least one field period is recorded on a plurality of tracks on a recording medium in an L-channel/S-segment recording system, L being an integer equal to or larger than 2, and S being a positive integer, said apparatus comprising:
   at least one rotating reproduction head provided for each of the L-channels for reproducing the video signal on said recording medium, wherein azimuth angles of said rotating reproduction heads are different for each channel;
   processor means coupled to said rotating reproduction heads for demodulating the video signal reproduced by said rotating reproduction head and for outputting the demodulated video signal;
   storing means for storing the demodulated video signal output from said processor means;
   storage control means for controlling said storing means so that the demodulated video signal is written in said storing means in synchronism with a synchronization signal detected from the reproduced signal and so that the stored video signal is read out in asynchronism with the detected synchronization signal; and
   recording medium travel control means for selecting a traveling speed for said recording medium so that when high speed playback occurs, said recording medium travel control means selects the traveling speed for said recording medium to be (N+1/L) times a recording speed, N being equal to 0, ±1, ±2, . . . .

3. A video signal recording and reproducing apparatus, wherein a video signal of at least one field period is recorded on a plurality of tracks on a recording medium in a single-channel/S-segment recording system, S being a positive integer unequal to 1, and wherein guard bands are provided between the tracks on the recording medium, said apparatus comprising:
   at least one pair of rotating heads for reproducing the video signal on said recording medium;
   processor means coupled to said rotating reproduction heads for demodulating the video signal reproduced by said rotating reproduction heads and for outputting said demodulated video signal;

storing means for storing the demodulated video signal output from said processor means;

storage control means for controlling said storing means so that said demodulated video signal is written in said storing means in synchronism with a synchronization signal detected from the reproduced signal and so that the stored video signal is read out in asynchronism with the detected synchronization signal; and recording medium travel control means for selecting a traveling speed for said recording medium so that when a change in reproduction speed occurs, said recording medium travel control means selects the traveling speed of said recording medium to be M times a recording speed, M being an even integer when said guard bands have a width less than a predetermined width, and to be $(N+\frac{1}{2})$ as high as the recording speed, N being equal to 0, $\pm 1$, $\pm 2$ . . . when said guard bands have a width greater than said predetermined width.

4. A video signal recording and reproducing apparatus, wherein a video signal of at least one field period is recorded on a plurality of tracks on a recording medium comprising L-channel/S-segment recording system, L and S being respectively positive integers which are not simultaneously equal to 1, said apparatus comprising:

at least one rotating reproduction head provided for each of the L-channels for reproducing the video signal on said recording medium, all of said rotating reproduction heads having equal azimuth angles;

processor means coupled to said rotating reproduction head for demodulating the video signal reproduced by said rotating reproduction head and for outputting said demodulated video signal;

storing means for storing the demodulated video signal output from said processor means;

storage control means for controlling said storing means so that the demodulated video signal is written in said storing means in synchronism with a synchronization signal detected from the reproduced signal and so that the stored video signal is read out in asynchronism with the detected synchronization signal; and recording medium travel control means for selecting a traveling speed for said recording medium so that when high speed playback occurs, said recording medium travel control means selects a traveling speed of the recording medium to be $(N+\frac{1}{2}L)$ times a recording speed, N being equal to 0, $\pm 1$, $\pm 2$, . . . .

5. A video signal recording and reproducing apparatus wherein a video signal of at least one field period is recorded on a plurality of tracks on a recording medium in an L-channel/1-segment recording system, L being a positive integer larger than one, said apparatus comprising:

at least one rotating head provided for each of the L-channels for reproducing the video signal on said recording medium;

processor means coupled to said rotating reproduction head for demodulating the video signal reproduced by said rotating reproduction head and for outputting the demodulated video signal;

storing means for storing the demodulated video signal output from the processor means;

storage control means for controlling said storing means so that the video signal is written in said storing means in synchronism with a synchronization signal detected from the reproduced signal and so that the video signal is read out in asynchronism with the synchronization signal; and recording medium travel control means for selecting a traveling speed of said recording medium so that in the case of a high speed playback, said recording medium travel control means selects the traveling speed of said recording medium to be $(N+m/M)$ times a recording speed, N being equal to 0, $\pm 1$, $\pm 2$ . . . , and m and M being positive integers having no common divisor except one.

6. A video signal reproducing apparatus, for producing a video signal of at least one field period recorded on a plurality of tracks on a recording medium in an L-channel/S-segment recording system, L and S being respectively positive integers which are never simultaneously equal to one, said apparatus comprising:

at least one rotating reproduction head provided for each of the L-channels for reproducing a video signal on said recording medium;

processor means coupled to said rotating reproduction head for demodulating the video signal reproduced by said rotating reproduction head, and for outputting the demodulated video signal;

storing means for storing the demodulated video signal output from the processor means;

storage control means for controlling said storing means so that the demodulated video signal is written in said storing means in synchronism with a synchronization signal detected from the reproduced signal and so that the stored demodulated video signal is read out in asynchronism with the detected synchronization signal; and recording medium travel control means for selecting a traveling speed of said recording medium so that in case of high speed playback, said recording medium travel control means selects the traveling speed of said recording medium to be $(N+m/M)$ times a recording speed, N being equal to 0, $\pm 1$, $\pm 2$, $\pm 3$, . . . , and m and M being positive integers having no common divisor except one and so that no integer r exists which satisfies the equation $(N+m/M) \times M \times k = r \times S$, wherein $k=1, 2, 3, \ldots, S-1$ and $M > m$.

7. A video signal reproducing apparatus, for producing a video signal of at least one field period recorded on a plurality of tracks on a recording medium in an L-channel/S-segment recording system, L being an integer equal to or larger than 2, and S being a positive integer, said apparatus comprising:

at least one rotating reproduction head provided for each of the L-channels for reproducing the video signal that is on said recording medium, wherein azimuth angles of said rotating reproduction heads are different for each channel;

processor means coupled to said rotating reproduction heads for demodulating the video signal reproduced by said rotating reproduction head and for outputting the demodulated video signal;

storing means for storing the demodulated video signal output from said processor means;

storage control means for controlling said storing means so that the demodulated video signal is written in said storing means in synchronism with a synchronization signal detected from the reproduced signal and so that the stored video signal is read out in asynchronism with the detected synchronization signal; and recording medium travel control means for selecting a traveling speed for said recording medium so that when high speed playback occurs, said recording medium travel control means selects the traveling speed for said recording medium to be (N+1/L) times a recording speed, N being equal to 0, ±1, ±2, . . . .

8. A video signal reproducing apparatus, for producing a video signal of at least one field period is recorded on a plurality of tracks on a recording medium in a single-channel/S-segment recording system, S being a positive integer unequal to 1, and wherein guard bands have been provided between the tracks on the recording medium, said apparatus comprising:

at least one pair of rotating heads for reproducing the video signal on said recording medium;

processor means coupled to said rotating reproduction heads for demodulating the video signal reproduced by said rotating reproduction heads and for outputting said demodulated video signal;

storing means for storing the demodulated video signal output from said processor means;

storage control means for controlling said storing means so that said demodulated video signal is written in said storing means in synchronism with a synchronization signal detected from the reproduced signal and so that the stored video signal is read out in asynchronism with the detected synchronization signal; and recording medium travel control means for selecting a traveling speed for said recording medium so that when a change in reproduction speed occurs, said recording medium travel control means selects the traveling speed of said recording medium to be M times a recording speed, M being an even integer when said guard bands have a width less than a predetermined width, and to be $(N+\frac{1}{2})$ as high as the recording speed, N being equal to 0, ±1, ±2, . . . when said guard bands have a width greater than said predetermined width.

9. A video signal reproducing apparatus, for producing a video signal of at least one field period recorded on a plurality of tracks on a recording medium comprising L-channel/S-segment recording system, L and S being respectively positive integers which are not simultaneously equal to 1, said apparatus comprising:

at least one rotating reproduction head provided for each of the L-channels for reproducing the video signal on said recording medium, all of said rotating reproduction heads having equal azimuth angles;

processor means coupled to said corresponding rotating reproduction head for demodulating the video signal reproduced by said rotating reproduction head and for outputting said demodulated video signal;

storing means for storing the demodulated video signal output from said processor means;

storage control means for controlling said storing means so that the demodulated video signal is written in said storing means in synchronism with a synchronization signal detected from the reproduced signal and so that the stored video signal is read out in asynchronism with the detected synchronization signal; and recording medium travel control means for selecting a traveling speed for said recording medium so that when high speed playback occurs, said recording medium travel control means selects a traveling speed of the recording medium to be $(N+\frac{1}{2}L)$ times a recording speed, N being equal to 0, ±1, ±2, . . . .

10. A video signal reproducing apparatus wherein a video signal of at least one field period is recorded on a plurality of tracks on a recording medium in an L-channel/1-segment recording system, L being a positive integer larger than one, said apparatus comprising:

at least one rotating head provided for each of the L-channels for reproducing the video signal on said recording medium;

processor means coupled to said rotating reproduction head for demodulating the video signal reproduced by said rotating reproduction head and for outputting the demodulated video signal;

storing means for storing the demodulated video signal output from the processor means;

storage control means for controlling said storing means so that the video signal is written in said storing means in synchronism with a synchronization signal detected from the reproduced signal and so that the video signal is read out in asynchronism with the synchronization signal; and recording medium travel control means for selecting a traveling speed of said recording medium so that in the case of a high speed playback, said recording medium travel control means selects the traveling speed of said recording medium to be (N+m/M) times a recording speed, N being equal to 0, ±1, ±2, . . . , and m and M being positive integers having no common divisor except one.

* * * * *

UNITED STATES PATENT AND TRADEMARK OFFICE
CERTIFICATE OF CORRECTION

PATENT NO. : 5,446,552
DATED : August 29, 1995
INVENTOR(S) : Sadayuki Inoue; Toshifumi Fujii It is certified that error appears in the above-indentified patent and that said Letters Patent is hereby corrected as shown below:

Column 14:
In claim 1, line 28, "being equal" should be -- N being equal --

Column 16:
In claim 6, line 1, after "apparatus" insert -- using an L-channel/S-segment system, L and S being respectively positive integers which are never simultaneously equal to one --

In claim 6, lines 1-2, "producing" should be -- reproducing a recording medium on which --

In claim 6, line 2, after "period" insert -- is --

In claim 6, lines 3-6, delete -- on a recording medium in an L-channel/S-segment recording system, L and S being respectively positive integers which are never simultaneously equal to one --

In claim 7, line 1, after "apparatus" insert -- using an L-channel/S-segment system, L being an integer equal to or larger than 2, and S being a positive integer --

In claim 7, lines 1-2, "producing" should be -- reproducing a recording medium on which --

In claim 7,. Line 2, after "period" insert -- is --

In claim 7, lines 3-6 delete -- on a recording medium in an L-channel/S-segment recording system, L being an integer equal to or larger than 2, and S being a positive integer --

In claim 7, line 9, after "signal" delete -- that is --

Column 17:
In claim 8, line 1, after "apparatus" insert -- using a single-channel/S-segment system, S being a positive integer unequal to 1 --

In claim 8, lines 1-2, "producing" should be -- reproducing a recording medium on which --

UNITED STATES PATENT AND TRADEMARK OFFICE
CERTIFICATE OF CORRECTION

PATENT NO. : 5,446,552
DATED : August 29, 1995
INVENTOR(S) : Sadayuki Inoue; Toshifumi Fujii It is certified that error appears in the above-indentified patent and that said Letters Patent is hereby corrected as shown below:

Column 17:
In claim 8, lines 3-5 delete --on a recording medium in a single channel/S-segment recording system, S being a positive integer unequal to 1--

In claim 9, lines 1-2 "producing" should be --reproducing a recording medium on which--

Column 18:
In Claim 10, line 1, after "apparatus" insert --using an L-channel/S-segment system, L being a positive integer larger than one, for reproducing a recording medium on which--

In claim 10, line 1, after "which" delete --wherein--

In claim 10, lines 3-6 delete --on a recording medium comprising L-channel/1-segment recording system, L being a positive integer larger than one--

Signed and Sealed this

Thirtieth Day of July, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,446,552
DATED : August 29, 1995
INVENTOR(S) : Sadayuki Inoue, Toshifumi Fujii It is certified that error appears in the above-indentified patent and that said Letters Patent is hereby corrected as shown below:

Col. 15, claim 4, line 29, "(N+½L)" should recite --(N + 1/(2L))--

Col. 17, claim 9, line 1, after "apparatus" insert --using an L-channel/S-segment system, L and S being respectively positive integers which are not simultaneously equal to 1,"

Col. 17, claim 9, line 2, after "period" insert --is--

Col. 18, line 21, claim 9, line 30, "(N+½L)" should recite --(N + 1/(2L))--

Col. 18, claim 10, line 1, "L-channel/S-segment" (added by Certificate of Correction issued July 30, 1996) should be --L-channel/1-segment--

Signed and Sealed this

Fifteenth Day of October, 1996

*Attest:*

BRUCE LEHMAN

*Attesting Officer*          Commissioner of Patents and Trademarks